(12) United States Patent
Heinzle et al.

(10) Patent No.: US 6,199,046 B1
(45) Date of Patent: Mar. 6, 2001

(54) METHOD SYSTEM AND ARTICLE OF MANUFACTURE FOR PERFORMING REAL TIME CURRENCY CONVERSION

(75) Inventors: Erich Siegfried Heinzle; Rolf von Behrens, both of South Australia (AU)

(73) Assignee: Adsura Pty Ltd., Kent Town (AU)

( * ) Notice: Subject to any disclaimer, the term of this patent is extended or adjusted under 35 U.S.C. 154(b) by 0 days.

(21) Appl. No.: 08/902,293

(22) Filed: Jul. 29, 1997

(51) Int. Cl.⁷ ...................................................... G06F 17/30
(52) U.S. Cl. .................... 705/1; 705/41; 705/14; 705/39; 705/400; 902/1; 345/347; 345/352
(58) Field of Search .................................. 705/14, 41, 39, 705/42, 400, 13, 38; 345/347, 352, 326, 346, 356

(56) References Cited

U.S. PATENT DOCUMENTS 5,077,804 * 12/1991 Richard ................................. 382/138

FOREIGN PATENT DOCUMENTS

0251619 * 7/1988 (EP) .

* cited by examiner

Primary Examiner—James P. Trammell
Assistant Examiner—Mussie Tesfamariam
(74) Attorney, Agent, or Firm—Hickman Stephens & Coleman, LLP

(57) ABSTRACT

A currency converter consisting of a source of exchange rate information with either an object performing the role of currency selection, exchange rate information retrieval, and price display, or objects undertaking currency selection and exchange rate information retrieval and price display. Prices embedded within the document or environment are displayed in the default or selected currency. The appropriate currency for price display is selected by using methods such as a menu used by the user, or by reading system information to choose the currency. The exchange rate information is retrieved from the source of exchange rate information and is then passed to any other price display object or objects, and optionally, any other currency selection and exchange rate retrieval objects or currency selection, exchange rate information retrieval, and price display objects in the document or environment.

34 Claims, 10 Drawing Sheets

Microfiche Appendix Included
(2 Microfiche, 118 Pages)

METHOD SYSTEM AND ARTICLE OF MANUFACTURE FOR PERFORMING REAL TIME CURRENCY CONVERSION

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

MICROFICHE APPENDIX

Portions of the present specification can be found in a microfiche appendix including 2 slides together having 118 frames.

1. Field of Invention

This invention relates to system processing in a network environment and more particularly to real time currency conversion of prices viewed within documents or environments on screen, in a networked environment.

2. Background of Invention

In networked environments such as the Internet and the associated World Wide Web (WWW), consumers must contend with pricing information in currencies different from their local currency owing to the geographically diverse nature of information they are accessing via the network.

By way of example, a consumer in Germany might view a bookstore in Australia on the Internet and see a book they wish to purchase. The consumer must then utilize exchange rate information to convert the amount in Australian dollars to Deutschmarks. The consumer may well have to convert to the US dollar as an intermediate step, because published exchange rates sometimes only detail the largest countries' exchange rates relative to the US dollar.

The consumer would need to obtain the exchange rate information from a newspaper, television, a bank, or from the Internet itself. Even if the exchange rates were obtained from the Internet utilizing sites, which allow exchange rate conversions to be, made, the consumer would be forced to leave the bookstore's site to calculate the price, and would have to return to the bookstore to continue with the purchase.

This process would be repeated for each product of interest to the consumer where the price was not in the consumer's local currency. Even for one given product, the process would have to be repeated if the consumer desired to see the price in another currency, if perhaps the consumer is able to draw upon funds in different currencies.

The sites, which exist on the Internet for currency conversion with up to date exchange rate information, are dedicated sites, which one must access separately to acquire information from the site to computer the exchange rate of the product. Once there, one must select the target and source currencies, and the amount needing conversion. The page then calculates and displays the final amount for you. Only then can one return to the original site selling the product and use the converted currency information.

It is a non-trivial problem for a site selling a product or service to solve this problem. It must have a mechanism in place for keeping track of the latest exchange rates, and must then either identify users and ascribe a currency preference to them individually, or maintain different versions. All of the various currencies would be required currency, with the pages being either a multiplicity of static pages, or pages that are dynamically produced with the desired currency.

The many disadvantages with the current state of the art can therefore be listed as follows:

(a) The exchange rate information used by the prospective customer to calculate the amount in the customer's local currency may itself be inaccurate due to time delays, especially if the information comes from a newspaper.

(b) The inconvenience of obtaining the exchange rate information is cumbersome and a distraction for the prospective customer who might otherwise purchase the product immediately if the price could be easily viewed in the customer's local currency.

(c) Any method whereby the prospective customer must retrieve the exchange rate information and/or perform the conversion elsewhere wastes the prospective customer's time, and must be repeated for each and every price that they wish to convert.

(d) Any method whereby the user must access additional network content such as a site with exchange rate information to establish prices will incur traffic charges. If the prospective customer is paying for volume of traffic and time connected, the prospective customer's time as well as money is wasted for each conversion.

(e) if the prospective customer has the ability to draw on funds in different currencies to purchase the product, any method requiring the prospective customer to retrieve the exchange rate information and/or perform the conversion elsewhere must be repeated for each currency they wish to view each price in.

(f) if the site provides separate versions of the site with different exchange rates, the prospective customer may not care for the inconvenience of deliberately selecting a regional version of the site using local currency.

(g) web sites cannot take advantage of a system whereby prices are independent objects linked to real time data on the Internet that can exist independently of the content to which they refer.

(h) each and every provider of documents or information which include prices must find a source of up-to-date exchange rate information if they are to provide versions of the information for different currencies.

(i) providers of documents which include prices must somehow determine the currency in which a user wishes to view pricing, which must be done on a site by site basis, and is unreliable and privacy infringing if done utilizing methods which seek to pinpoint the location of the user on the network, such as by using IP addresses.

Clearly, the lack of easy currency conversion in the current networked age where geographical distance is becoming irrelevant to transaction processing is a major impediment to global commerce. What is required is a facility whereby the conversion of pricing information to the consumer's local currency is simple enough that it can take place without distracting the consumer from the task of shopping.

The prior art has failed to realize that the price observed in a networked environment can be a dynamic object which relies on information retrieved over a communications network which is distinct from the information in which it is embedded.

SUMMARY OF THE INVENTION

According to a broad aspect of a preferred embodiment of the invention, a system is disclosed which overcomes these problems by eliminating the need for the prospective consumer to undertake the calculations necessary to convert a price to a local currency. Where normally static prices in a fixed denomination appear, our currency converter replaces them with prices that can be changed by simply selecting the appropriate currency for display. Upon selecting the appropriate currency, exchange rate information is retrieved from an up to date source over a communications network, and is used to change the prices displayed in the selected currency. It follows that the consumer merely selects the desired currency, and then the prices that the consumer is viewing are converted to the chosen currency automatically.

In another aspect of a preferred embodiment of the invention, uncertainty relating to the timeliness and accuracy of exchange rate information used in performing the currency conversion is eliminated.

Yet another aspect eliminates the cumbersome and distracting step of the prospective customer having to deliberately retrieve the exchange rate information to perform the currency conversion calculation.

Still another aspect eliminates the need for the customer to retrieve exchange rate information and perform a currency conversion calculation for each price they wish to see in their currency of choice.

A further aspect reduces the necessary network bandwidth necessary to access exchange rate information and/or currency converters online repeatedly to convert a number of prices on a site, thereby saving time and money.

Still further objects and advantage will become apparent in the ensuing description and the detailed discussion of the invention.

BRIEF DESCRIPTION OF THE DRAWINGS

The above and further advantages of the invention may be better understood by referring to the following description, in conjunction with the accompanying drawings, in which.

DETAILED DESCRIPTION

DESCRIPTION OF REFERENCE NUMERALS IN DRAWINGS

FIGS. 1 through 24 illustrate various configurations of one or more instances of the following four objects which are number 1–4.

(1) refers to the source of information required for the currency exchange object to calculate the currency conversion. It could consist of a file server such as, but not limited to, a Hypertext Transfer Protocol (HTTP) server, a File Transfer Protocol (FTP) server, or a similar information server, such as a WAIS or gopher server.

(2) refers to a combined price display and currency selection object. The object can display one or a multiplicity of prices, and allows the user to select the desired currency in which to display the price.

(3) refers to a currency selection object that is separate from (4). The currency selection object allows the user to select the currency that they wish the price or prices to be displayed in.

(4) refers to a price display object that is separate from (3), and can display one or a multiplicity of prices, in the currency selected by (3).

Where there is a multiplicity of objects, they are denoted in the FIGS. by "1a, 1b–1n", or "3a–3n", etc.

Figure 24:
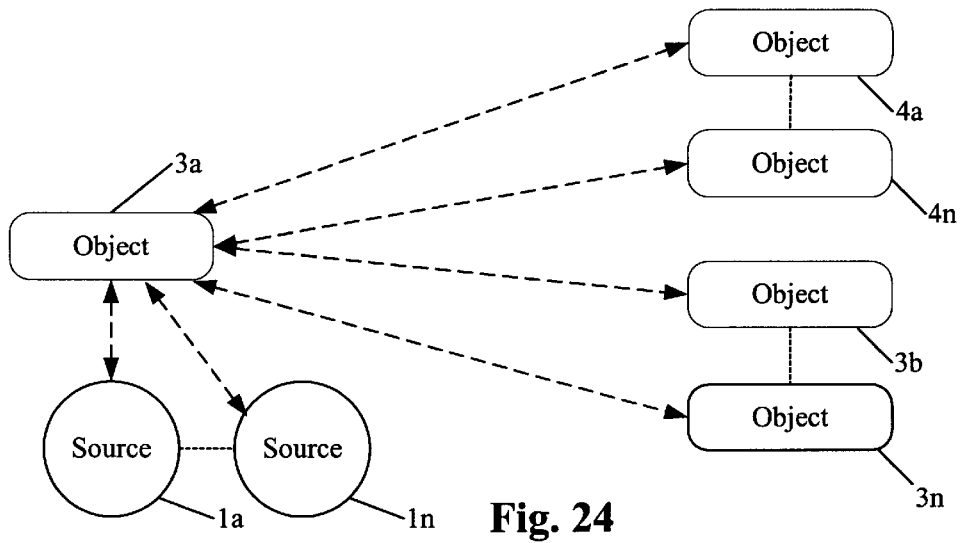
FIG. 24 illustrates a flexibility feature in accordance with a preferred embodiment.
Figure 25:
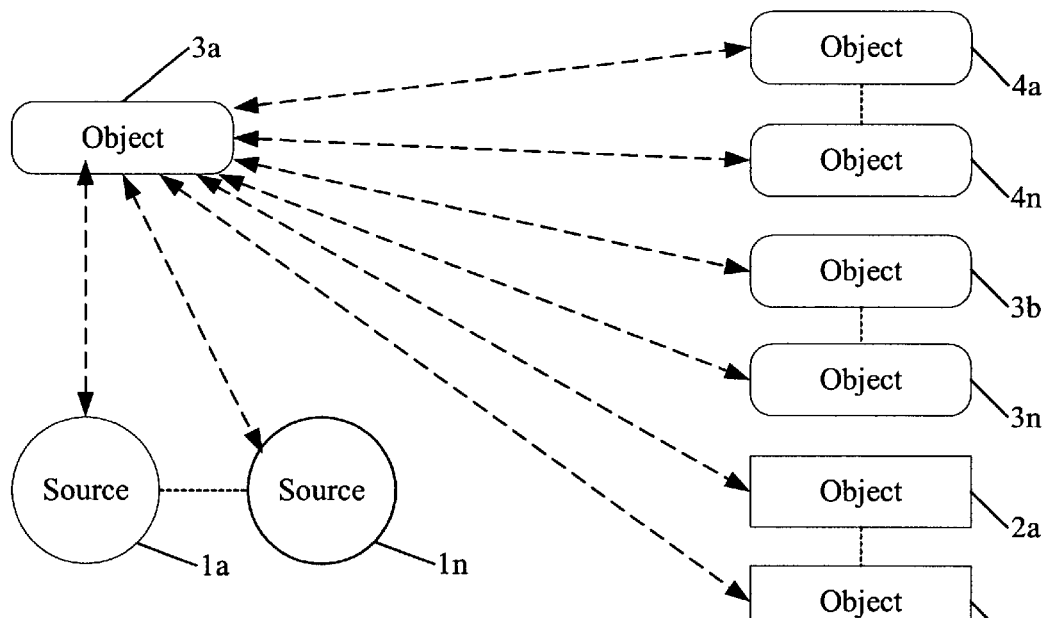
FIG. 25 is an extension of FIG. 24 wherein there is also a multiplicity of exchange rate information sources in accordance with a preferred embodiment.
Figure 26:
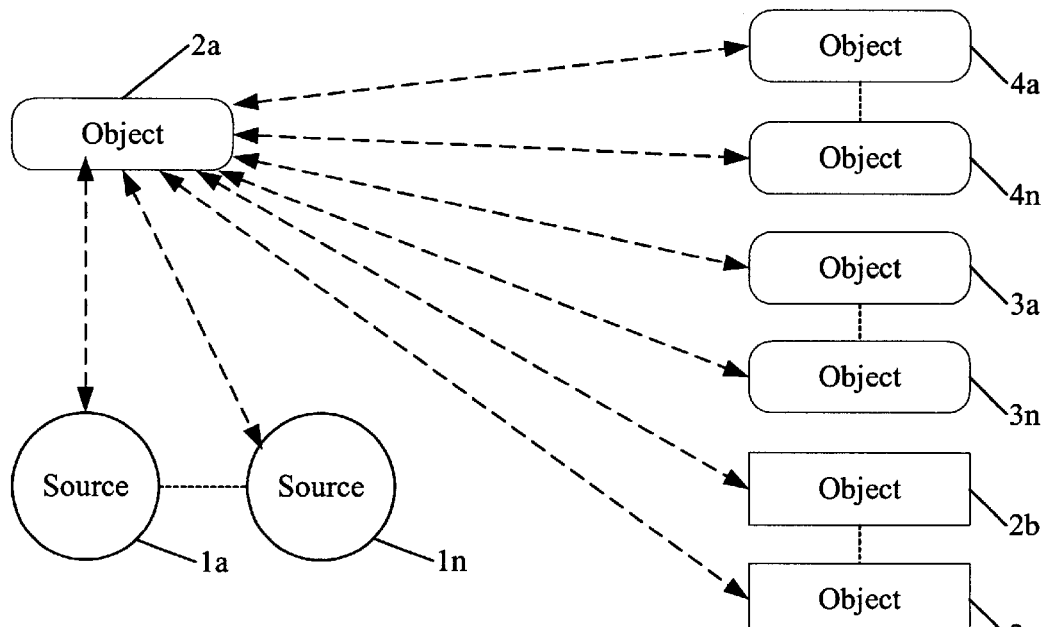
FIG. 26 illustrates a currency selection and exchange rate retrieval object in accordance with a preferred embodiment.

FIGS. 1 through 24 depict various configurations of the following features, and FIGS. 25 and 26 illustrate a combination of the following features:

- a source or sources of exchange rate information (1) and a combined currency selection, exchange rate retrieval and price display object or objects (2), or,
- a source or sources of exchange rate information (1) and a separate currency selection and exchange rate retrieval object or objects (3) and price display object or objects (4).

A preferred embodiment and each of the alternative embodiments of the currency converter achieve the stated objects of the invention which are to display prices in the currency of the user's choosing, where the conversion of the price to the desired currency takes place using exchange rate information retrieved over a communications network.

Description Of Drawings

Figure 1:
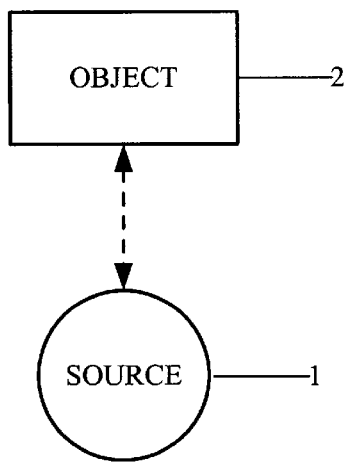
FIG. 1 is a block diagram of a representative hardware environment is depicted, which illustrates a typical hardware configuration of a workstation in accordance with a preferred embodiment.

A preferred embodiment of a system in accordance with the present invention is preferably practiced in the context of a personal computer such as the IBM PS/2, Apple Macintosh computer or UNIX based workstation. A representative hardware environment is depicted in FIG. 1, which illustrates a typical hardware configuration of a workstation in accordance with a preferred embodiment having a central processing unit 10, such as a microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Windows Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines will have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times. There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the merchant. HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of progranmming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications.

One of ordinary skill in the art will readily recognize that ActiveX could be substituted for JAVA without undue experimentation to practice the invention.

Figure 2:
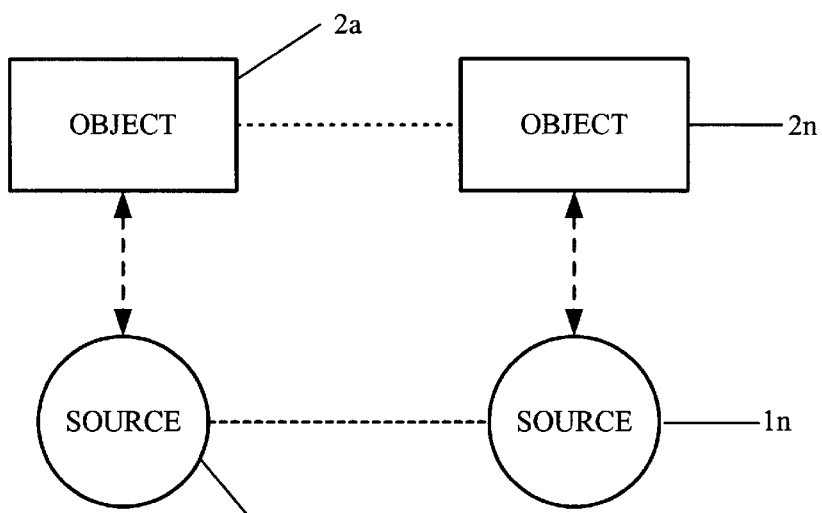
FIG. 2 illustrates a source of exchange rate information in accordance with a preferred embodiment.

The currency converter in its simplest form is depicted in FIG. 2. FIG. 2 shows a source of exchange rate information (1), and a combined currency selection, exchange rate retrieval and price display object (2). The exchange rate information source (1) provides the information required by the currency selection, exchange rate retrieval and price display object (2) to enable it to convert the displayed price to a price in the currency of the user's choosing. The currency selection, exchange rate retrieval and price display object (2) have methods enabling them to display the price or prices in the currency of choice. These methods include a method for establishing the price or prices to be displayed initially, a method for establishing the currency in which the price or prices are to be displayed, and a method for retrieving the latest exchange rate information to display the price accurately in the currency of choice.

Figure 3:
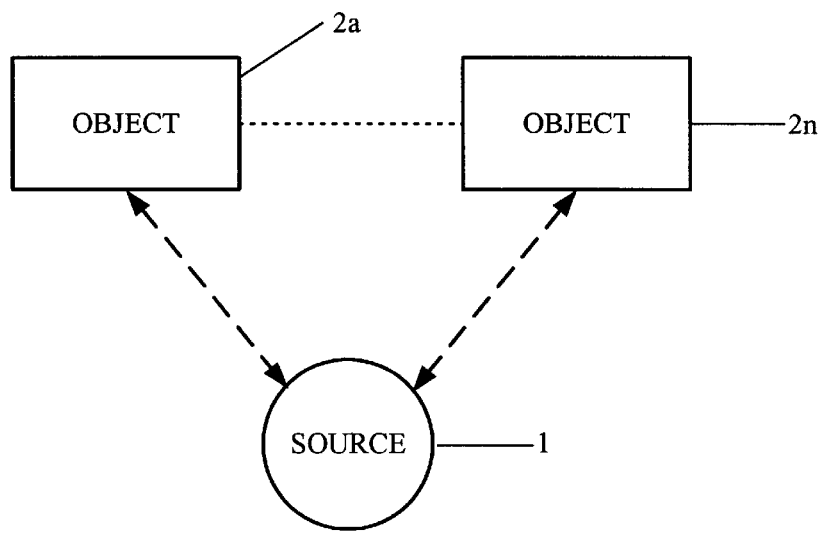
FIG. 3 details an embodiment of an extension of the arrangement illustrated in FIG. 2 in accordance with a preferred embodiment.

FIG. 3 shows the embodiment of an extension of the arrangement in FIG. 2, where a multiplicity of pairs of exchange rate information sources (1a)–(1n) and the corresponding multiplicity of the currency selection, exchange rate retrieval and price display object (2a)–(2n) exist.

Figure 4:
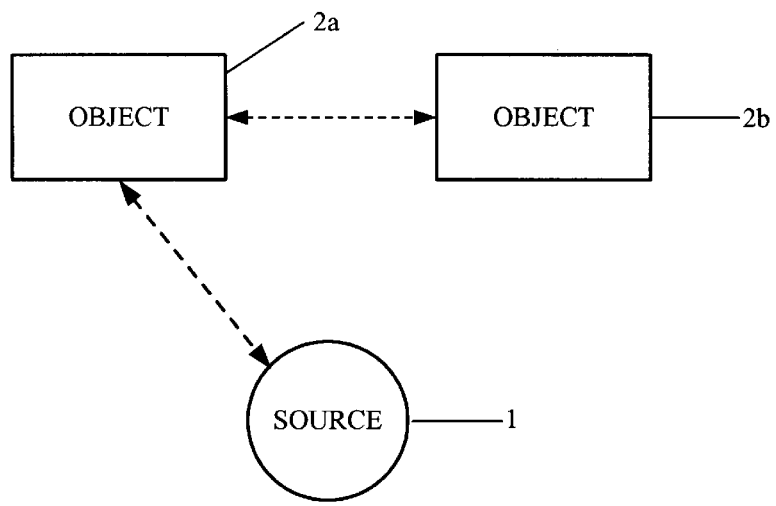
FIG. 4 details how duplication can be eliminated by having only one exchange rate information source in accordance with a preferred embodiment.

Clearly, the embodiment depicted in FIG. 3 need not necessarily duplicate the exchange rate information source (1a)–(1n). FIG. 4 shows how this duplication can be eliminated by having only one exchange rate information source (1), which is accessed by the currency selection, exchange rate retrieval and price display object (2a)–(2n). The embodiment depicted in FIG. 4 is an improvement upon the embodiment depicted in FIG. 3 if duplication of the exchange rate information is undesirable or unnecessary.

Figure 5:
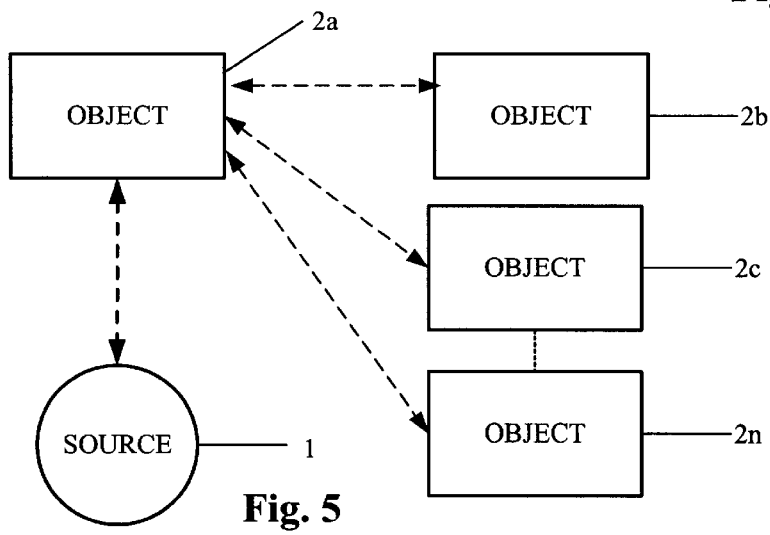
FIG. 5 depicts an arrangement whereby only the currency selection, exchange rate retrieval and price display object retrieves the exchange rate information from the exchange rate information source in accordance with a preferred embodiment.

The embodiment depicted in FIG. 4 need not necessarily duplicate the process of retrieval of exchange rate information by each of the currency selection, exchange rate retrieval and price display object (2a–2n) from the exchange rate information source (1). FIG. 5 depicts an arrangement whereby only the currency selection, exchange rate retrieval and price display object (2a) retrieves the exchange rate information from the exchange rate information source (1), and then passes this information onto the other the currency selection, exchange rate retrieval and price display object (2b). When (2a) and (2b) reside within close proximity of each other, such as when depicting prices within the same document, environment, or operating system, or a number of documents or environments being viewed together, the embodiment depicted in FIG. 5 is more efficient in terms of network traffic than that depicted in FIG. 3. The currency selection, exchange rate retrieval and price display object (2a) that accesses the exchange rate information source (1) would typically, but not necessarily, be the currency selection, exchange rate retrieval and price display object with which the user interacts to change the currency.

FIG. 5 depicts an extension of the embodiment depicted in FIG. 4, where the initial currency selection, exchange rate retrieval and price display object (2a) broadcasts the information to all other local currency selection and price display objects (2b)–(2n). The currency selection, exchange rate retrieval and price display object (2a) that accesses the exchange rate information source (1) would typically, but not necessarily, be the currency selection, exchange rate retrieval and price display object with which the user interacts to change the currency.

Figure 6:
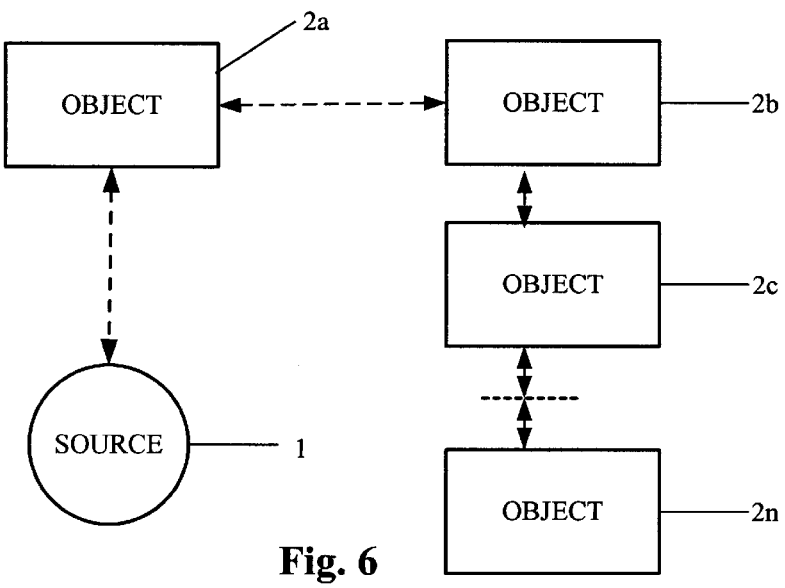
FIG. 6 depicts an extension of the embodiment depicted in FIG. 5, where the initial currency selection, exchange rate retrieval and price display object broadcasts the information to all other local currency selection and price display objects in accordance with a preferred embodiment.
Figure 7:
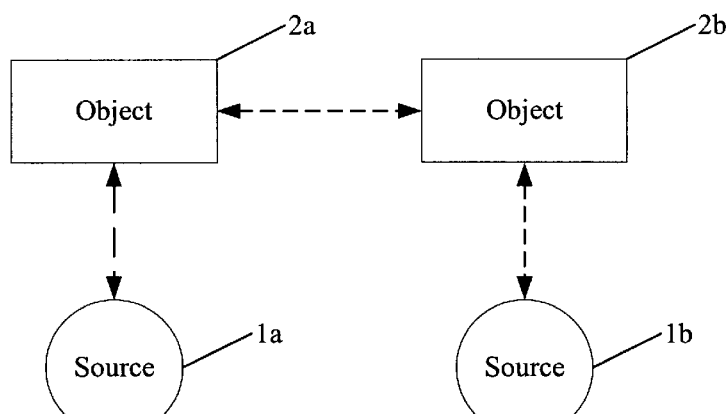
FIG. 7 details an alternative embodiment to FIG. 6 whereby each of the currency selection, exchange rate retrieval and price display objects passes information from one object to the next in a "relay" fashion.

An alternative implementation of the embodiment depicted in FIG. 6 is depicted in FIG. 7, whereby each of the currency selection, exchange rate retrieval and price display objects (2a)–(2n) passes information from one object to the next in a "relay" fashion. This implementation is preferable if the information must be passed from one currency selection, exchange rate retrieval and price display object to another, and the currency selection, exchange rate retrieval and price display objects are embedded in a sequence of documents or environments enabling the order of transfer of information to be efficiently deduced. The currency selection, exchange rate retrieval and price display object (2a) that accesses the exchange rate information source (1) would typically, but not necessarily, be the currency selection, exchange rate retrieval and price display object with which the user interacts to change the currency.

A combination of the embodiments depicted in FIG. 5 and FIG. 6 is possible, where the information can be broadcast from the first currency selection, exchange rate retrieval and price display object to a currency selection, exchange rate retrieval and price display object in each of a number of documents or environments. Then the price display object proceeds to pass the information to all other currency selection, exchange rate retrieval and price display objects in their respective documents or environments in either a relay fashion, or the information is broadcasted to all other currency selection, exchange rate retrieval and price display objects in each of their respective documents or environments, thereby "cascading" the information.

Figure 8:
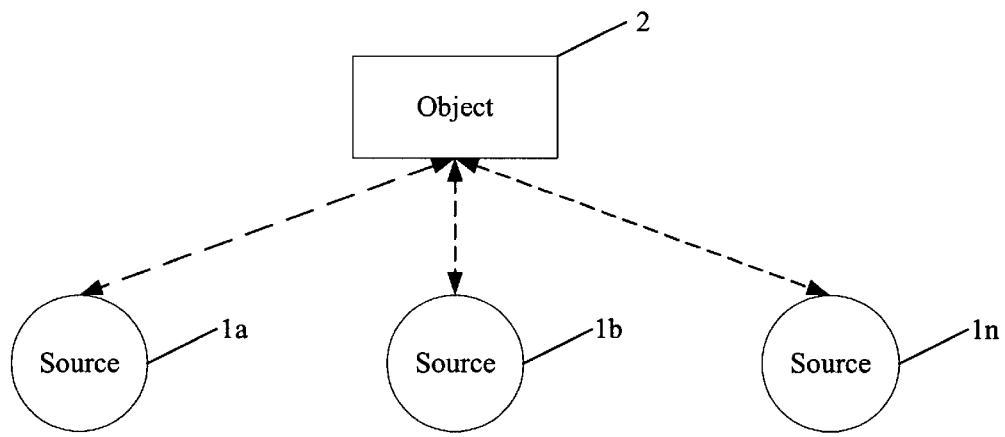
FIG. 8 illustrates exchange rate information in accordance with a preferred embodiment.

FIG. 8 demonstrates that in any implementation there need not necessarily be a unique single source of exchange rate information. For example, source (1a) may have exchange rate data pertaining to conversions to or from the US dollar, whereas source (1b) may have exchange rate data pertaining to conversions to or from the Australian dollar. Exchange rate information can be passed between the currency selection, exchange rate retrieval and price display objects (2a)–(2b).

Figure 9:
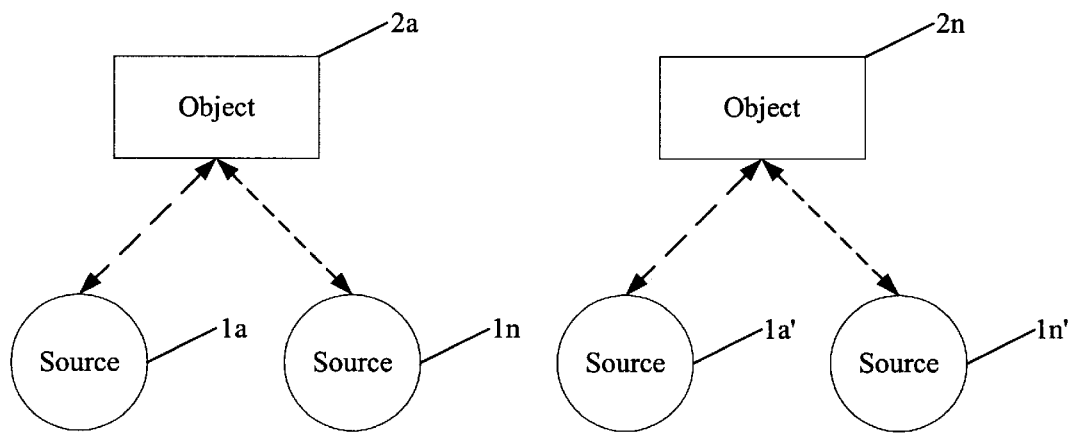
FIG. 9 is an extension of FIG. 8, where a currency selection, exchange rate retrieval and price display object is able to access multiple sources of exchange rate information in accordance with a preferred embodiment.

FIG. 9 is an extension of FIG. 8, where a currency selection, exchange rate retrieval and price display object is able to access multiple sources of exchange rate information. The exchange rate information can reside in separate files in the same single location, or over multiple locations.

Figure 10:
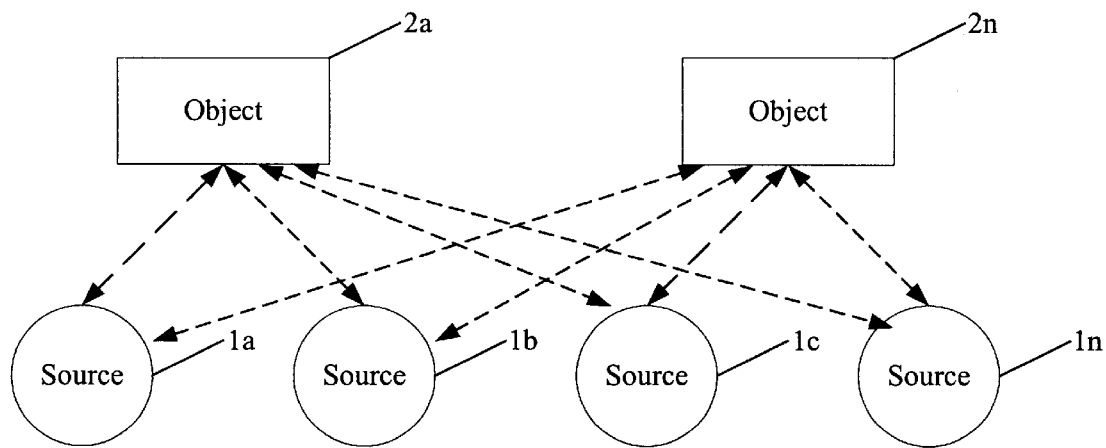
FIG. 10 shows another extension of FIG. 9, where there can be a multiplicity of currency selection, exchange rate retrieval and price display object in accordance with a preferred embodiment.

FIG. 10 shows another extension of FIG. 9, where there can be a multiplicity of currency selection, exchange rate retrieval and price display object in an implementation, each of which accessing a multiplicity of exchange rate information sources (1a)–(1n) . . . (1a'–1n').

Figure 11:
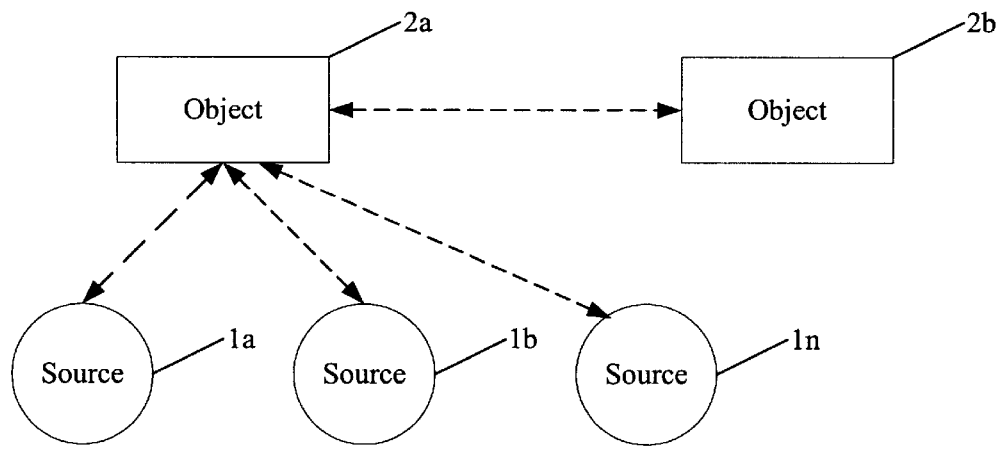
FIG. 11 illustrates a multiplicity of currency selection, exchange rate retrieval and price display objects with shared sources of exchange rate information in accordance with a preferred embodiment.
Figure 12:
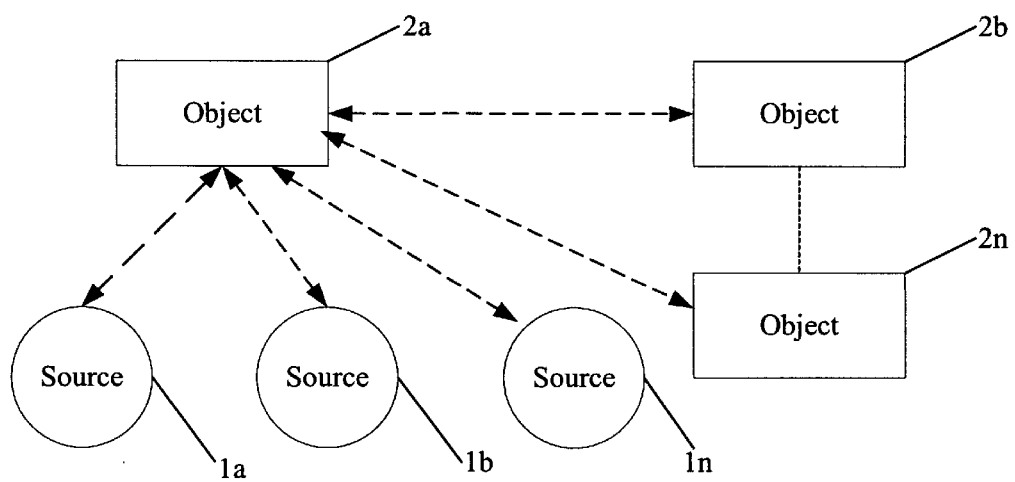
FIG. 12 illustrates a system which reduces network traffic in accordance with a preferred embodiment.

FIG. 11 shows that in implementing the embodiment depicted in FIG. 10, the multiplicity of currency selection, exchange rate retrieval and price display objects (2a)–(2n) can share some or all of the sources of exchange rate information (1a)–(1n). An implementation of FIG. 11 that reduces network traffic is shown in FIG. 12, where the exchange rate information sources (1a)–(1n) are accessed by only one of the currency selection, exchange rate retrieval and price display object accessed (2a), which then passes the information to the second currency selection, exchange rate retrieval and price display object (2b). The currency selection, exchange rate retrieval and price display object (2a) that accesses the exchange rate information source (1) would typically, but not necessarily, be the currency selection, exchange rate retrieval and price display object with which the user interacts to change the currency.

Figure 13:
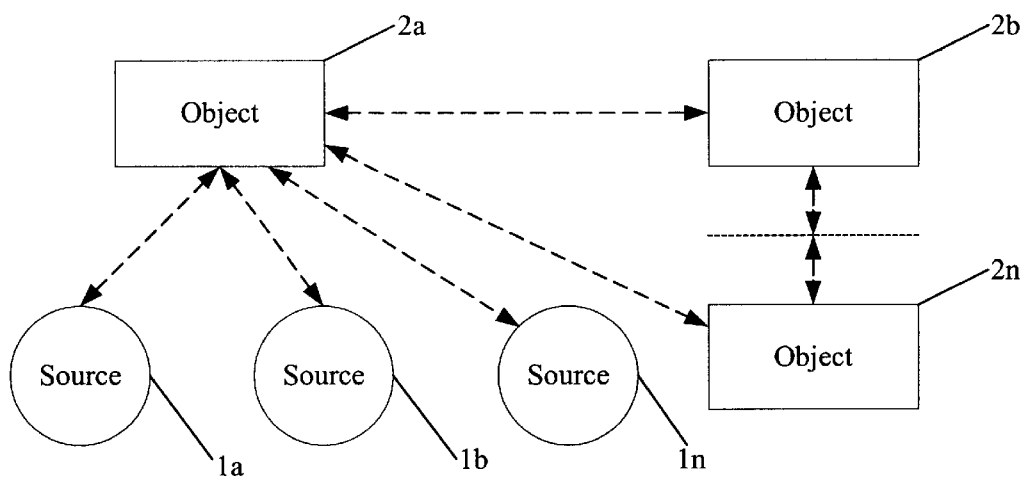
FIG. 13 depicts a multiplicity of the currency selection, exchange rate retrieval and price display objects in accordance with a preferred embodiment.

FIG. 13 shows an extension of the embodiment in FIG. 12, where there is a multiplicity of the currency selection, exchange rate retrieval and price display objects (2a)–(2n). FIG. 13 is also an extension of the implementation depicted in FIG. 5. The currency selection, exchange rate retrieval and price display object (2a) that accesses the exchange rate information source (1) would typically, but not necessarily, be the currency selection, exchange rate retrieval and price display object with which the user interacts to change the currency.

Figure 14:
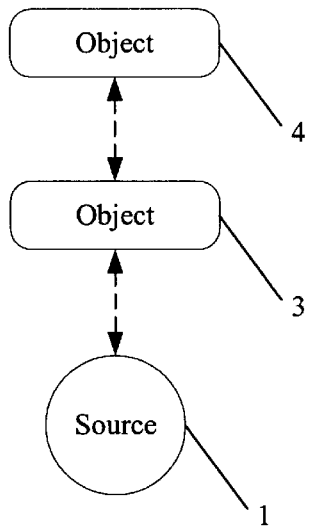
FIG. 14 depicts exchange rate information passed in "relay" fashion in accordance with a preferred embodiment.

FIG. 14 demonstrates an alternative mechanism for implementing the embodiment depicted in FIG. 13, where the exchange rate information is passed in "relay" fashion from on the currency selection, exchange rate retrieval and price display object to another. This is analogous to the implementation depicted in FIG. 7. The currency selection, exchange rate retrieval and price display object (2a) that accesses the exchange rate information source (1) would typically, but not necessarily, be the currency selection, exchange rate retrieval and price display object with which the user interacts to change the currency.

A combination of the embodiments depicted in FIG. 13 and FIG. 14 is also possible.

An alternative implementation to the variations of the implementation utilizing a currency selection, exchange rate retrieval and price display object (2) or a multiplicity thereof, and an exchange rate information source (1), or a multiplicity thereof, is to separate the functions of currency selection, and exchange rate retrieval from price display. This may be the preferred implementation if there are use, access, design and placement considerations relating to the combined currency selection, exchange rate retrieval and price display objects.

Figure 15:
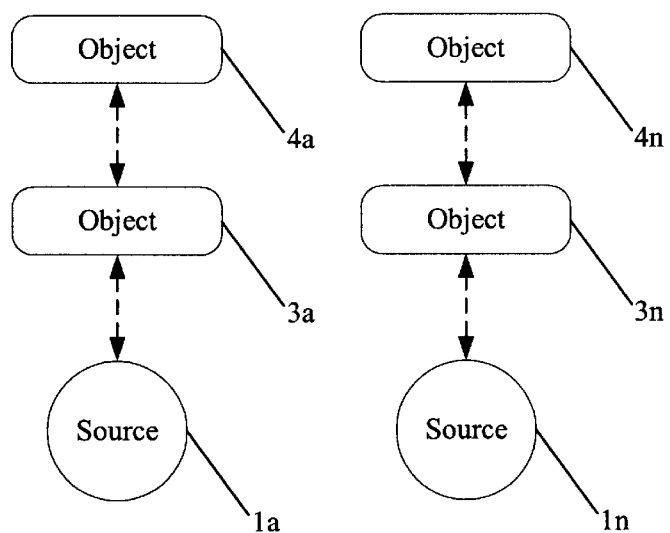
FIG. 15 illustrates an embodiment in which the currency is selected with the currency selection and exchange rate retrieval object and the price displayed by the price display object is converted to the selected currency.

The simplest implementation in this form is depicted in FIG. 15, where (1) is the source of exchange rate information, (3) is the currency selection and exchange rate retrieval object, and (4) is the price display object. The currency is selected with the currency selection and exchange rate retrieval object (4), and the price displayed by the price display object (4) is converted to the selected currency.

Figure 16:
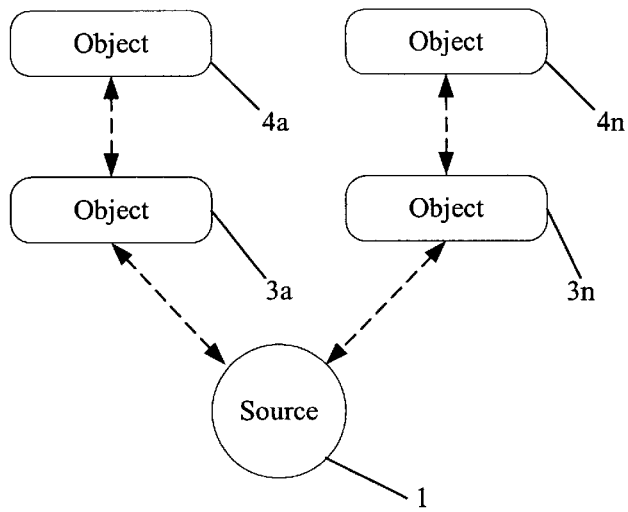
FIG. 16 details an extension of the embodiment depicted in FIG. 15.

FIG. 16 shows an extension of the embodiment depicted in FIG. 15, showing a multiplicity of the price display objects (4a)–(4n) and currency selection and exchange rate retrieval objects (3a)–(3n), and their respective exchange rate information sources (1a)–(1n).

Figure 17:
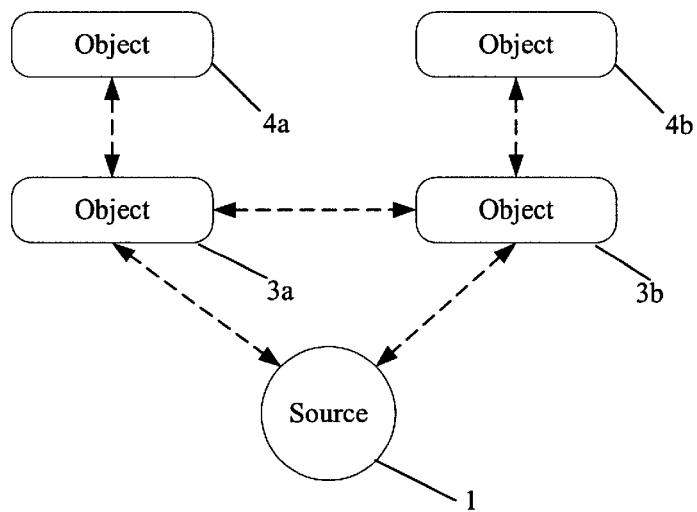
FIG. 17 depicts an alternative implementation of that depicted in FIG. 16, where the multiplicity of the price display objects and currency selection and exchange rate retrieval objects need not utilize multiple copies of a source of exchange rate information.

FIG. 17 shows an alternative implementation of that depicted in FIG. 16, where the multiplicity of the price display objects (4a)–(4n) and currency selection and exchange rate retrieval objects (3a)–(3n) need not utilize multiple copies of a source of exchange rate information (1).

Figure 18:
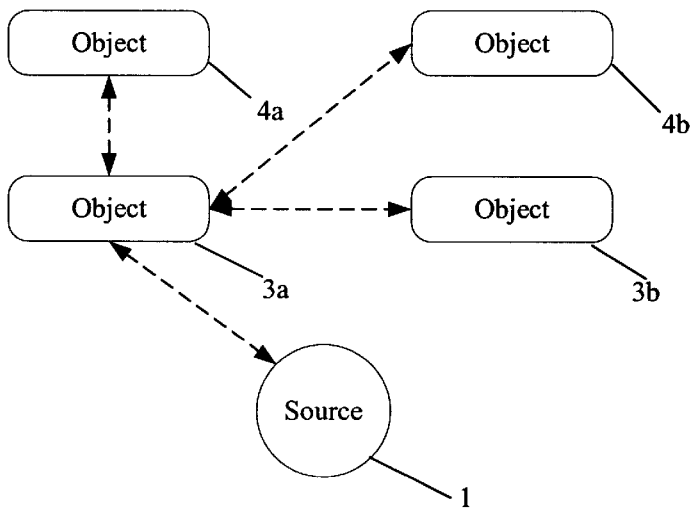
FIG. 18 is an alternative implementation of the embodiment depicted in FIG. 17.

An alternative implementation of the embodiment depicted in FIG. 17 is shown in FIG. 18, whereby only one of the currency selection objects (3a) accesses the source of exchange rate information (1), and passes the information to its associated price display object (4a) and to the second currency selection and exchange rate retrieval object (3b), which then proceeds to pass the information to it's associated price display object (4b). This implementation reduces the network traffic produced in retrieving the exchange rate information. The currency selection and exchange rate retrieval object (3a) that accesses the exchange rate information source (1) would typically, but not necessarily, be the currency selection and exchange rate retrieval object with which the user interacts to change the currency.

Figure 19:
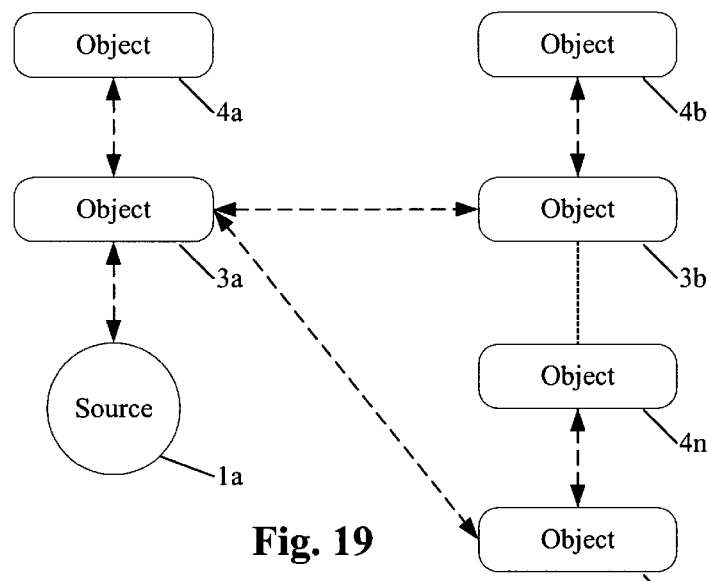
FIGS. 19, 20 and 21 are alternative embodiments of the embodiment depicted in FIG. 18.

The subsequent step of the currency selection and exchange rate retrieval object (3b) passing the information to its associated price display object (4b) in FIG. 18 can be eliminated by having the first currency selection and exchange rate retrieval object pass the information to both the other currency selection and exchange rate retrieval object (3b) and the other price display object (4b), as is depicted in FIG. 19. No delay is necessary before commencing the second currency selection and exchange rate retrieval object (3b) to implement its method of passing the exchange rate information to its associated price display object (4) which may impose a performance penalty on the overall process of changing the currency. The currency selection and exchange rate retrieval object (3a) that accesses the exchange rate information source (1) would typically, but not necessarily, be the currency selection and exchange rate retrieval object with which the user interacts to change the currency.

However, if the two pairs of price display objects (4a)–(4b) and their associated currency selection and exchange rate retrieval objects (3a)–(3b) are distributed over a network, it may be more efficient in terms of network traffic to have the exchange rate information passed to the other currency selection and exchange rate retrieval object (3b), which passes the information on to its paired price display object (4a)–(4n), with the saving in network traffic produced offsetting any performance penalty resulting from the subsequent transfer of exchange rate information between (3b) and (4b).

Figure 20:
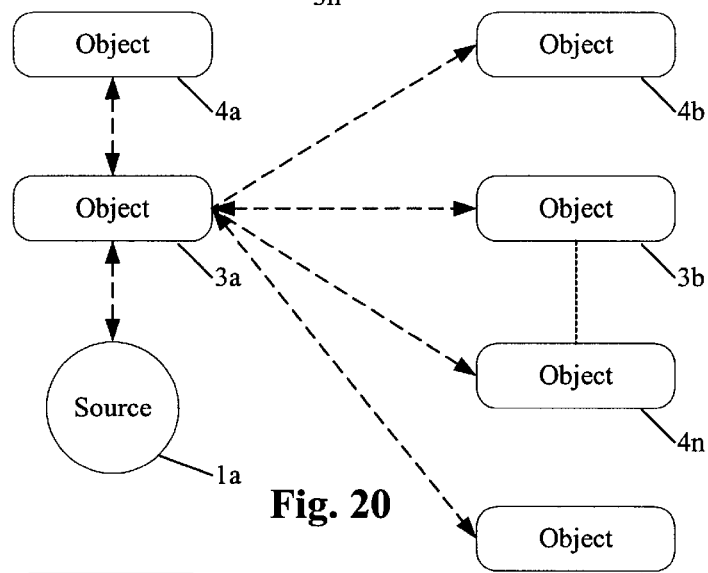
Figure 21:
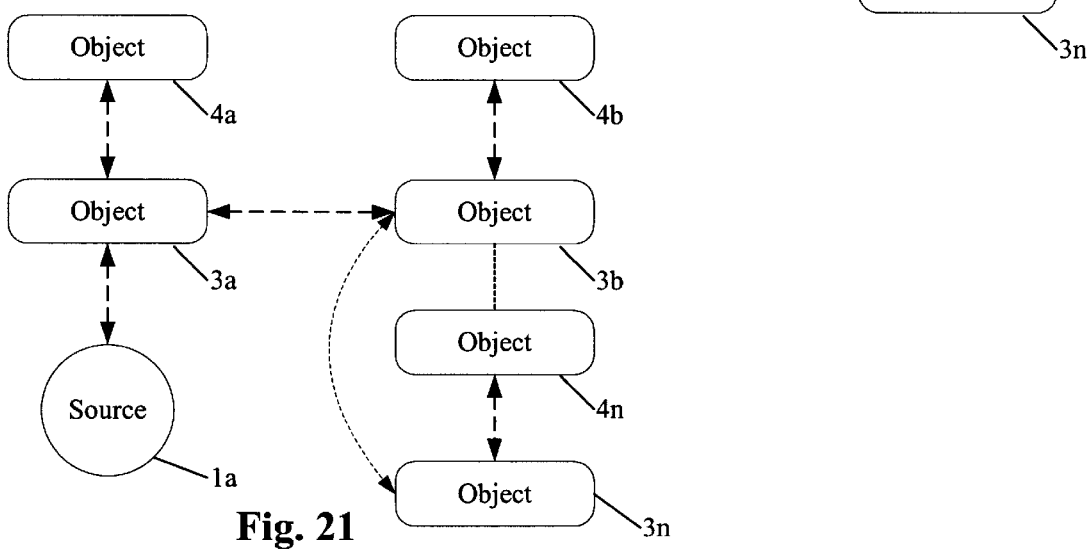

The efficiency considerations just outlined relating to FIG. 18 and FIG. 19 apply to the extensions of FIG. 17 and FIG. 18 depicted in FIG. 20 and FIG. 21, where there is a multiplicity of pairs of currency selection and exchange rate retrieval objects (3a)–(3n) and price display objects (4a)–(4n). The currency selection and exchange rate retrieval object (3a) that accesses the exchange rate information source (1) would typically, but not necessarily, be the currency selection and exchange rate retrieval object with which the user interacts to change the currency.

Figure 22:
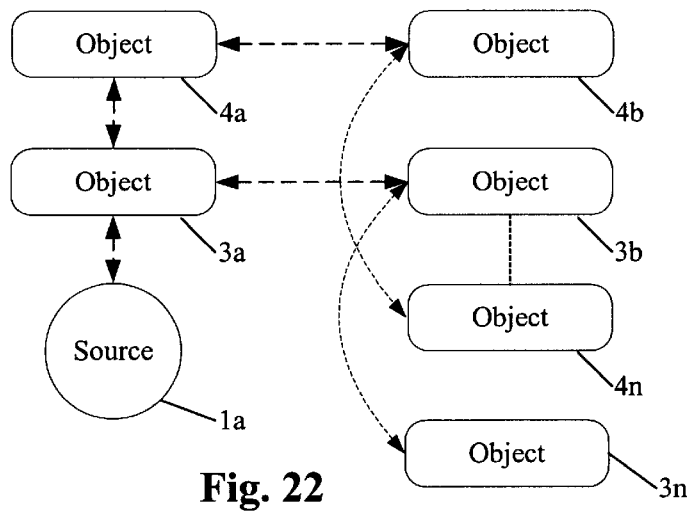
FIGS. 22 and 23 illustrate additional implementations of the distribution of exchange rate information in accordance with a preferred embodiment.
Figure 23:
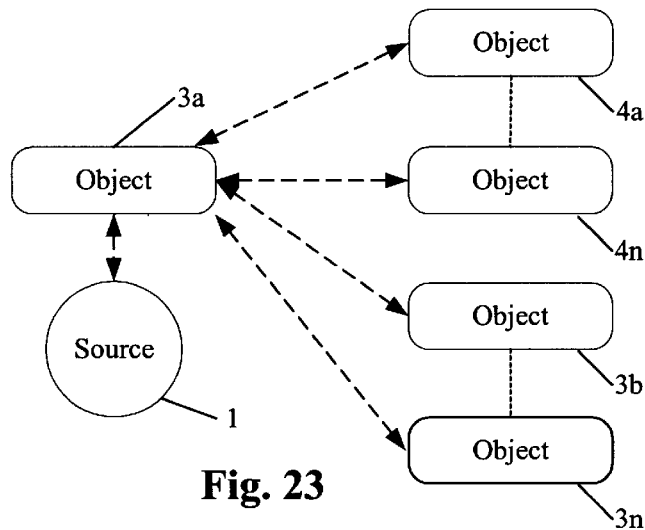

FIG. 22 and FIG. 23 depict additional implementations of the distribution of exchange rate information from the first currency selection and exchange rate retrieval object (3a). The currency selection and exchange rate retrieval object (3a) that accesses the exchange rate information source (1) would typically, but not necessarily, be the currency selection and exchange rate retrieval object with which the user interacts to change the currency.

FIG. 24 demonstrates that there need not necessarily be the same number of price display objects (4a)–(4n) as currency selection and exchange rate retrieval objects (3a)–(3n), and that they can be conceived of as independent groups of objects. The currency selection and exchange rate retrieval object (3a) that accesses the exchange rate information source (1) would typically, but not necessarily, be the currency selection and exchange rate retrieval object with which the user interacts to change the currency.

FIG. 25 is an extension of FIG. 24 wherein there is also a multiplicity of exchange rate information sources. The currency selection and exchange rate retrieval object (3a) that accesses the exchange rate information source (1) would typically, but not necessarily, be the currency selection and exchange rate retrieval object with which the user interacts to change the currency.

A synthesis of the two basic implementations which have been described and comprise:

the combined currency selection, exchange rate retrieval and price display object or objects (2), or, the combination of the currency selection and exchange rate retrieval object or objects (3) and the price display object or objects (4)

would be composed of a combination of these. FIG. 26 shows a currency selection and exchange rate retrieval object (3a) which retrieves the selected currency's exchange rate information from one or a plurality of exchange rate information sources (1a)–(1n), and passes the information to:

one or a plurality of other price display objects that only display their price or prices (4a)–(4n), one or a plurality of other currency selection, exchange rate retrieval and price display objects (2a)–(2n), and one or a plurality of other currency selection and exchange rate retrieval objects embedded within the document, environment, or operating system (3b)–(3n).

where the currency selection and exchange rate retrieval object (3a) that accesses the exchange rate information source (1) typically, but not necessarily, being the currency selection and exchange rate retrieval object with which the user interacts to change the currency.

Figure 27:
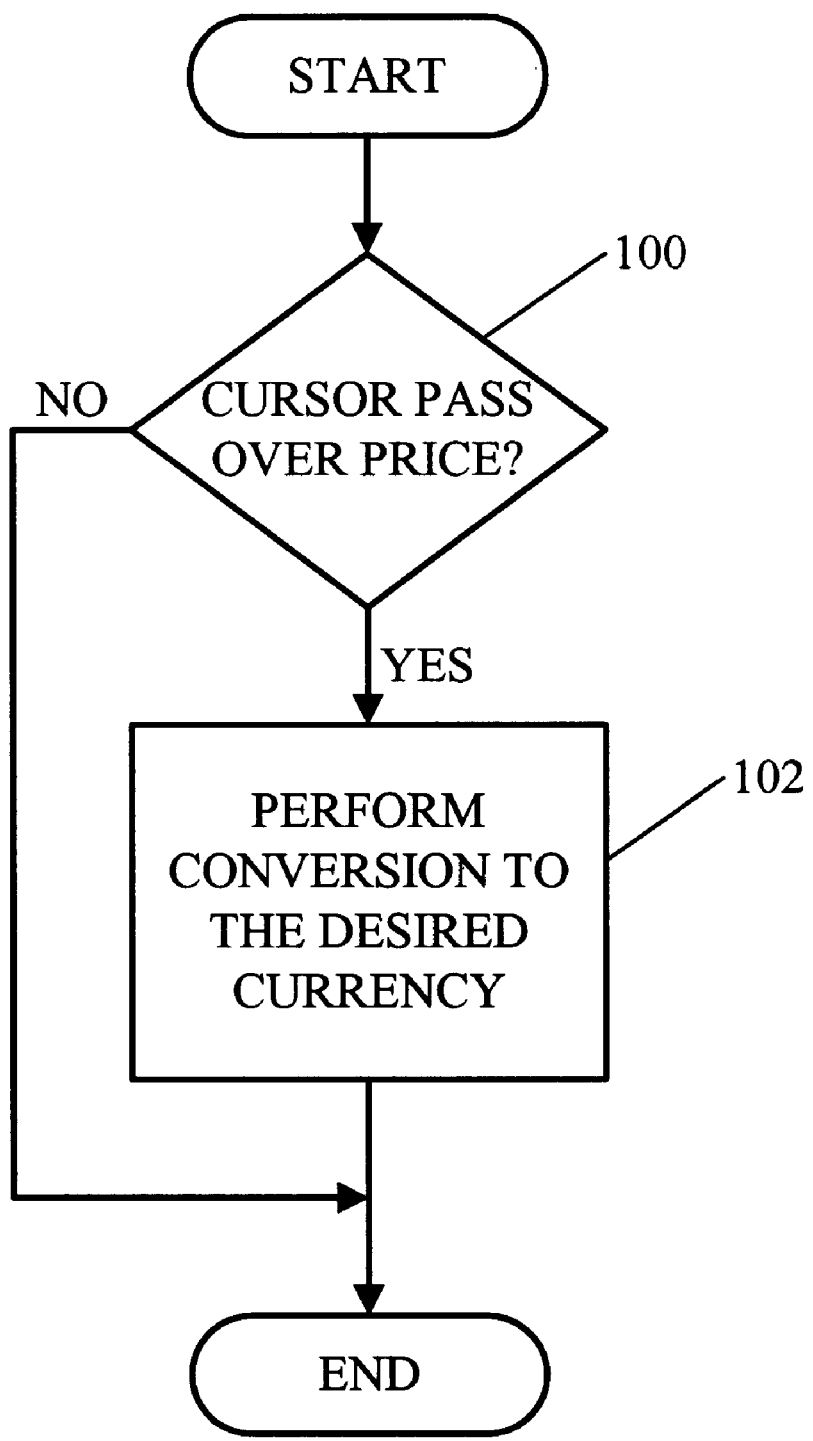
FIG. 27 is a flowchart showing the conversion of the price display upon passing a cursor thereover.

Another implementation incorporating these two basic implementations is shown in FIG. 27 where a currency selection, exchange rate retrieval and price display object (2a) which retrieves the selected currency's exchange rate information from one or a plurality of exchange rate information sources (1a)–(1n), and passes the information to one or a plurality of other price display objects that only display their price or prices (4a)–(4n), one or a plurality of other currency selection, exchange rate retrieval and price display objects (2b)–(2n), and one or a plurality of other currency selection and exchange rate retrieval objects embedded within the document, environment, or operating system (3a)–(3n).

where the currency selection, exchange rate retrieval and price display object (2a) that accesses the exchange rate information source (1) typically, but not necessarily, being the currency selection and exchange rate retrieval object with which the user interacts to change the currency.

Description And Operation Of A Currency Converter In Accordance With A Preferred Embodiment A preferred embodiment consists of any one or combination of the following objects or groups of objects utilized to display prices embedded within a document or environment:

One or a multiplicity of the currency selection, exchange rate retrieval and price display object (2), as depicted in FIGS. 1 to 13, acting in concert with an exchange rate information source or sources (1).

one or a multiplicity of the currency selection and exchange rate retrieval object (3) with one or a multiplicity of the price display object (4), as depicted in FIG. 25 and FIG. 26, acting in concert with an exchange rate information source or sources (1).

one or a multiplicity of the currency selection, exchange rate retrieval and price display object (2), with one or a multiplicity of the price display object (4), acting in concert with an exchange rate information source or sources (1).

The nature and function of the first component, the source of exchange rate information (1), common to the various embodiments which are to be described in detail will be described first.

After this the nature and function of the currency selection, exchange rate retrieval and price display object (2) will be described, which, together with the source of exchange rate information (1), realizes the currency converter's basic embodiment, which is shown in its various forms in FIGS. 1 to 13.

After this the nature and function of the currency selection and exchange rate retrieval object (3) and the price display object (4) will be described, which, together with the source of exchange rate information (1), realizes a variation in implementation of the simplest embodiment, which is shown in various forms in FIGS. 14 to 24.

Exchange Rate Information Source (1)

Object (1) in FIGS. 1 to 26 is the source of exchange rate information. Where denoted by (1a)–(1n), there is a multiplicity of such sources of exchange rate information. It can be, but is not limited to, a file containing exchange rate details which is accessed by a protocol for information retrieval over a communications network, such as, but not limited to, the ubiquitous File Transfer Protocol (FTP), Hypertext Transfer Protocol (HTTP), Trivial File Transfer Protocol (TFTP), WAIS, gopher, or teletext. Various protocols have advantages over others, such as, but not limited to, enabling additional information to be sent with the data specifying how long until the data is out of date, or enabling additional data to be sent detailing from where the request originates (such as is allowed by the Hypertext Transfer Protocol header, or cookie technology that can be used with the Hypertext Transfer Protocol), or the protocol has a smaller overhead in terms of additional information that is required to be sent along with the data by the protocol, or the protocol may incorporate error correction.

The communications network over which the exchange rate data is retrieved can be, but is not limited to, packet based wireless data networks utilizing the AX.25 protocol, communications networks utilizing Transmission Control Protocol/Internet Protocol (TCP/IP), or Asynchronous Transfer Mode (ATM)

communications networks utilizing Point To Point Protocol (PPP) or Serial Line Interface Protocol (SLIP) based connections over telephone lines, or Integrated Services Digital Networks (ISDN).

The source from which the exchange rate information is transferred need not necessarily be the source from which the documents or environments using the currency selection, exchange rate retrieval and price display objects (2), the currency selection and exchange rate retrieval object (3) or price display object (4) are retrieved. For example, a document or environment on the World Wide Web may embed a reference to a price display object that is located at a different source altogether, which utilizes exchange rate information at a different source again.

A practitioner skilled in the art of computer networking and computer system administration could readily prepare a host computer on a Transmission Control Protocol/Internet Protocol (TCP/IP) based communications network with File Transfer Protocol (FTP) or Hypertext Transfer Protocol (HTTP) server software enabling the host computer to serve the exchange rate information data to currency selection, exchange rate retrieval and price display objects (2) and currency selection objects (3) in response to requests sent over the communications network for the exchange rate information.

The exchange rate information data consists of the information needed by the price display objects to convert the prices from the default currency to the user's selected currency. For any given default currency, it need only specify the exchange rates between the default currency and all other currencies in which prices are to be displayed. Naturally, all the information required to convert any currency to any other currency can be placed in the one file, but, given that the document or environment which utilizes the currency selection, exchange rate retrieval and price display object (2) or currency selection and exchange rate retrieval object (3) will usually contain price information in a default currency or a number of currencies, it follows that all conversion calculations need only use exchange rate information detailing prevailing exchange rates to or from the nominated default currency or currencies.

It follows, then, that a possible improvement is to have multiple exchange rate information data, each of which only supplying exchange rate data relating to a single base currency. So, for any given document or environment which utilizes the currency selection, exchange rate retrieval and price display object (2) or currency selection and exchange rate retrieval object (3), only the exchange rate information data relating to the default currency specified in the document or environment needs to be retrieved, thereby minimizing the amount of information that needs to be sent over the network. If, however, there is a very large number of different default currencies for price displaying objects to display in a document, environment, group of documents, or group of environments, then exchange rate information for conversions to or from all currencies could be transmitted over the network without realizing any performance penalty. In order to minimize network traffic, compression algorithms can be used to minimize the amount of data sent over the network to the currency selection, exchange rate retrieval and price display object (2), or to the currency selection and exchange rate retrieval object (3). A practitioner skilled in the art of computer programming could readily implement a scheme whereby the exchange rate information is compressed, and later decompressed by the currency selection and exchange rate retrieval and price display object (2), or the currency selection and exchange rate retrieval object (3).

Someone skilled in the art of computer programming could set up the exchange rate information source (1) without undue experimentation such that it can distribute a complete set of exchange rate information relating to the default currency specified by the currency selection, exchange rate retrieval and price display object (2) or currency selection and exchange rate retrieval object (3) and thereafter can distribute a separate set of exchange rate information to the aforementioned currency selection, exchange rate retrieval and price display object (2) or currency selection and exchange rate retrieval object (3) containing only details relating to currencies whose exchange rates have changed since the previous update of information, thereby reducing the amount of traffic sent over the network.

The exchange rate information for conversions to or from a single currency distributed to the currency selection, exchange rate retrieval and price display object (2) or currency selection and exchange rate retrieval object (3) would in its simplest form contain a sequence of numbers in a predefined order which represent the buy and sell rates of the single currency to which the exchange rate information relates and all the other currencies, in the predefined order, in which prices are to be displayed. If the prices that are viewed are only for the purposes of purchasing of products, then only the buy rates of the base currency for the various currencies to be displayed is required. Conversely, if the prices represent offers to buy, then only the sell rates of the base currency for the various currencies to be displayed is required.

The exchange rate information sources can be located all on the one server, or can be on separate servers. For ease of administration of the exchange rate information, and for security issues which are as follows:

minimizing the number of exchange rate information sources that must be trusted to provide reliable information platform independent bytecode or equivalent multiplatform implementations of the currency selection, exchange rate retrieval and price display objects (2) or currency selection and exchange rate retrieval objects (3) which are retrieved over the communications network may only allow network connections to the source from which they were served.

it follows that a preferred implementation keeping these objectives in mind would have all the exchange rate information resident on one server for any given document or environment utilizing currency selection, exchange rate retrieval and price display objects (2) or currency selection and exchange rate retrieval objects (3).

The exchange rate information data in a preferred embodiment would contain fields which indicate the currency that each exchange rate or pair of exchange rates relate to, rather than relying on a predefined order of currencies.

A preferred embodiment could include information specifying how old the exchange rate information is, which can either be used:

by the user to judge exchange rate validity or how up to date the exchange rate information is.

by the currency selection, exchange rate retrieval and price display object (2), currency selection and exchange rate retrieval object (3), or price display object (4) to initiate a request for more recent information.

In an embodiment of the currency converter which is more fully integrated into an object oriented operating system, the exchange rate information itself may reside locally on the user's machine, with the computer's operating system routinely obtaining the exchange rate information required for use by local embodiments of the currency selection, exchange rate retrieval and price display object (2), currency selection and exchange rate retrieval object (3), or price display object (4) locally.

Currency Selection, Exchange Rate Retrieval and Price Display Object (2)

Having described the exchange rate information source or sources depicted either singly as (1) or in a plurality as (1a)–(1n), in FIG. 1 to FIG. 26, the description of the currency selection, exchange rate retrieval and price display object depicted either singly as (2) or in a plurality as (2a)–(2n) in FIG. 1 to FIG. 13, FIG. 25, and FIG. 26 follows.

The currency selection, exchange rate retrieval and price display object (2) can be used to embed a price or prices within the text, images or objects of a document or environment such as, but not limited to, a Hypertext Markup Language (HTML) document, a Virtual Reality Modeling Language (VRML) environment, or a Multi User Dimension (MUD).

The currency selection, exchange rate retrieval and price display object (2) consists of a number of methods:

- A method which accepts the parameters of the default currency, the price or prices to be displayed in the default currency, and in a preferred implementation, accepts cosmetic parameters which allow the price to be displayed seamlessly within the document or environment, such as, but not limited to, the color of the price, the font size of the price, and the price text's background color. The form of the parameters can be, but is not limited to, parameters embedded within a Hypertext Markup Language (HTML) document, or parameters in a file separate from the document, environment, or operating system in which the prices are displayed. The document or environment in which the prices are displayed can be dynamically generated or exist in a static form.
- In a preferred embodiment, a method which accepts parameters which can accept margins for particular currencies to be subtracted or added to the displayed price, or restrictions on which currencies the prices can be seen in.
- A method which allows the user to specify the currency in which they wish to view prices within the document, environment, or operating system, such as, but not limited to,
  - allowing the user to utilize a pointing device such as a mouse to scroll through and select the desired currency for displaying the price or prices when the mouse pointer is dragged over the price displayed, as indicated by operations 100 and 102 in FIG. 27, or
  - a method which reads the user's operating system or environment variables to determine the currency in which the prices are to be displayed, or
  - a method which determines the preferred currency in which the prices are to be displayed by reading parameters from a source located on the communications network
- A method which retrieves the latest exchange rate information from the source of exchange rate information (1), which would typically, but not necessarily be located elsewhere on the network, and would be retrieved utilizing a network data transfer protocol such as, but not limited to, File Transfer Protocol (FTP) or Hypertext Transfer Protocol (HTTP).
- A method by which the object displays the price or prices in the default or selected currency within the document, environment, or operating system, such as, but not limited to,
  - passing a text string to a node within a Virtual Reality Modeling Language (VRML) environment,
  - providing an image of the price to be displayed for embedding within a Hypertext Markup Language (HTML) document,
  - displaying the entire document or environment with all prices in the default or selected currency,
  - passing the document to a program to display once the prices have been changed.
- In a preferred implementation, a method which routinely obtains the latest exchange rate information to update any prices displayed in a currency other than the default currency, such as, but not limited to, obtaining the latest exchange rate information from the exchange rate information source every twenty minutes, such source would typically, but not necessarily, be located elsewhere on the network, and would be retrieved utilizing a network data transfer protocol such as, but not limited to, File Transfer Protocol (FTP) or Hypertext Transfer Protocol (HTTP).
- In a preferred implementation, a method which, when the object is used to select the desired currency, passes the desired currency's exchange rate information to any other currency selection, exchange rate retrieval and price display objects (2b)–(2n), and to any currency selection and exchange rate retrieval objects (3a)–(3n) and price display objects (4a)–(4n), residing within the same document, environment, or operating system.
- In the preferred implementation just mentioned, a method which allows the object to receive the desired currency's exchange rate information from the particular currency selection, exchange rate retrieval and price display object (2) or the currency selection and exchange rate retrieval object (3) utilized by the user to select the currency for the prices to be displayed in, and then utilize the information to display the price in the newly selected currency.

Currency Selection and Exchange Rate Retrieval Object (3), and Price Display Object (4)

The same object that implements the currency selection, exchange rate retrieval and price display object (2) can implement either (3) or (4) by only implementing a subset of the methods in (2). The source code provided in the first example implements versions of any of these three objects.

The currency selection, exchange rate retrieval and price display object's (2) methods can be divided and/or shared between the currency selection and exchange rate retrieval object (3), and the price display object (4). This can be done to minimize the memory utilized by the collection of currency selection and exchange rate retrieval objects (3), and the price display objects (4), as each object will only incorporate the code required to fulfill its function. It follows that the currency selection and exchange rate retrieval object (3) would have the following methods:

- A method which accepts the parameters of the default currency. The form of the parameters can be, but is not limited to, parameters embedded within a Hypertext Markup Language (HTML) document, or parameters in a file separate from the document or environment in which the prices are displayed.
- A method which allows the user to specify the currency in which they wish to view prices within the document, environment, or operating system, such as, but not limited to,
  - allowing the user to utilize a pointing device such as a mouse to scroll through and select the desired currency for displaying the price or prices in when the mouse pointer is dragged over the price displayed, or a method which reads the user's operating system or environment variables to determine the currency in which the prices are to be displayed.

A method which retrieves the latest exchange rate information from the source of exchange rate information (1), which would typically, but not necessarily be located elsewhere on the network, and would be retrieved utilizing a network data transfer protocol such as, but not limited to, File Transfer Protocol (FTP) or Hypertext Transfer Protocol (HTTP).

In a preferred implementation, a method which routinely obtains the latest exchange rate information to update any prices displayed in a currency other than the default currency, such as, but not limited to, obtaining the latest exchange rate information from the exchange rate information source every twenty minutes, which would typically, but not necessarily be located elsewhere on the network, and would be retrieved utilizing a network data transfer protocol such as, but not limited to, File Transfer Protocol (FTP) or Hypertext Transfer Protocol (HTTP).

In a preferred implementation, a method which, when the object is used to select the desired currency, passes the desired currency's exchange rate information to other currency selection and exchange rate retrieval objects (3b)–(3n), price display objects (4a)–(4n), and currency selection, exchange rate retrieval and price display objects (2a)–(2n) residing within the same document, environment, or operating system.

In the preferred implementation just mentioned, a method which allows the object to receive the desired currency's exchange rate information from the particular currency selection and exchange rate retrieval object (3) or currency selection, exchange rate retrieval and price display objects (2) utilized by the user to select the currency display for the prices.

It follows that the price display object (4) would have a combination of the following methods.

A method which accepts the parameters of the default currency, the price or prices to be displayed in the default currency, and in a preferred implementation, accepts cosmetic parameters which allow the price to be displayed seamlessly within the document, environment, or operating system, such as the color of the price, the font size of the price, and the price text's background color. The form of the parameters can be, but is not limited to, parameters embedded within a Hypertext Markup Language (HTML) document, or parameters in a file separate from the document or environment in which the prices are displayed.

A method by which the object displays the price or prices in the default or selected currency within the document or environment such as, but not limited to, passing a text string to a node within a Virtual Reality Modeling Language (VRML) environment, or providing an image of the price to be displayed for embedding within a Hypertext Markup Language (HTML) document, or displaying the entire document or environment with all prices in the default or selected currency A method which allows the object to receive the desired currency's exchange rate information from the particular currency selection and exchange rate retrieval object (3) or currency selection, exchange rate retrieval and price display objects (2) utilized by the user to select the currency for the prices to be displayed in, and then utilize the information to display the price in the newly selected currency.

EXAMPLE ONE

Description and Discussion of Preferred Implementation Consisting of Objects (2), (3), (4) Written in Java™, and Description of Their Use The control flow of Example One is best understood by using the following guide to the functions implemented in the source code, and referring to the source code itself, which is presented at the end of the description.

mainSetup( ):
calls drawInfoImage( ) to draw a simple picture
calls importRates( )
init( ):
reads in all the different parameters and then sets the default currency
getStrParam( ):
makes sure the parameter we read in exists
mouseDown( ):
sets mouseX to the current x position of the mouse (within the Applet)
mouseDrag( ):
If it is a Type 4 Applet it loads the exchange rates if they have not been loaded already
gives the exchange rates to all the other display Applets, by calling setRates( )
changes the current currency if you drag your mouse along the x-axis (left or right)
mouseUp( ):
if a new currency has been selected it tells the other display Applets what it is
checkFontSize( ):
makes certain that the string to be displayed fits into the area the Applet takes up
otherwise it will reduce the font so it does fit
importRates( ):
updates the currency conversion rates
setExchangeRate( ):
calculates and sets the value to be displayed (for the new currency)
paint( ):
if it's a type 2 or type 4 Applet it displays the price in the currently selected currency, and if the Applet is a type 3 Applet, it displays the current currency only.

The source code supplied for Example 1 is written in the platform independent bytecode language Java™, the trademark Java™ is owned by Sun Microsystems, Inc. The example has been written using a platform independent bytecode to make it as portable as possible. The example can be compiled using Sun Microsystems' Java™ Development Kit (JDK) 1.0.2 or later on any computer supporting Sun Microsystems Java™ Development Kit (JDK) 1.0.2 or later, or on any machine supporting a Java™ bytecode compiler, and the resulting Applet can be run on any computer which supports a World Wide Web (WWW) browser supporting Java™, or on any computer with an Applet viewing utility, such as that provided in Sun Microsystems' Java™ Development Kit (JDK) 1.0.2 or later.

Because the Applet implements all the methods of the currency selection, exchange rate retrieval and price display object (2), it also necessarily implements the combined methods of the currency selection and exchange rate retrieval object (3), and the price display object (4).

Given the above, the source provided for disclosure of the currency converter when compiled will produce an Applet that can be configured to function as any of the following:

currency selection, exchange rate retrieval and price display object (2), currency selection and exchange rate retrieval object (3), and a price display object (4);

where the function of each of the above objects is as outlined in the descriptions of the operation of the Currency converter.

Someone skilled in the art of programming can readily utilize the source code provided to produce single purpose Applets which function as one of the above objects by removing code that implements unnecessary methods and functions for any particular object, and the code enabling it to have it's behavior specified by parameters.

Sample computer program code can be found in an microfiche appendix.

Begin File Listing: NumDisp.java

```
import java.awt.*;
import java.net.*;
import java.io.*;
import java.util.*;
import java.applet.Applet;
public class numDisp extends java.applet.Applet {
    protected boolean ratesImported = false;
    private int fontSize, y, mouseX, selectedIndex, intType,
fontStyle = Font.PLAIN;
    private float value, newValue, originalCurrencyValue;
    private boolean mouseMoved = false, inSequence = false;
    private String denomStr, valueStr, outStr, strCurrency;
    private Font f;
    private Vector appletList = new Vector();
    private Image TypeTwoImage;
    private Color myBGColor, myFGcolor;
    private float[] valueArray = new float[37];
    private String[] denomArray = {"USD", "AUD", "Sch", "Bah$",
"Bar$",
        "BFr", "Ber$", "L", "Can$", "Pes",
        "CR", "DK", "DG", "EP", "ECU",
        "FM", "FFr", "DM", "GD", "HK$"};
    private String getStrParam(String str) {
        if((str = getParameter(str)) != null)
            return str;
        return "NULL";
    }
    private int parseRGB(String str) throws
NumberFormatException {
        if (str.startsWith("0x")) {
            return Integer.parseInt(str.substring(2), 16);
        } else if (str.startsWith("0")) {
            return Integer.parseInt(str.substring(1), 8);
        } else {
            return Integer.parseInt(str);
        }
    }
    private void checkFontSize(String str) {
        FontMetrics fm;
        int tmpSize = fontSize + 1;
        do {
            f = new Font("Helvetica", fontStyle, --tmpSize);
            fm = getFontMetrics(f);
        } while((size().width <= fm.stringWidth(str)) && (tmpSize > 4));
        y = (size().height - (fm.getAscent() / 2));
    }
    private Image drawInfoImage() {
        Image infoImage = createImage(size().width, 100);
        Graphics infoG = infoImage.getGraphics();
        infoG.setColor(myBGColor);
        infoG.fillRect(0,0,size().width, size().height);
        infoG.setColor(Color.blue);
        infoG.fillOval(25,5,200,55);
        infoG.setColor(Color.white);
        infoG.setFont(new Font("TimesRoman",
Font.BOLD, 36));
        infoG.drawString("Adsura", 65, 45);
        infoG.setColor(Color.black);
        infoG.setFont(new Font("TimesRoman",
Font.PLAIN, 12));
    infoG.drawString("Drag your mouse along this Applet, to change", 5, 75);
    infoG.drawString("the currency!", 5, 87);
        return infoImage;
    }
    private void mainSetup() {
        TypeTwoImage = drawInfoImage();
        importRates();
    }
    public void init() {
        valueStr = new String(getStrParam("amount"));
        denomStr = new String(getStrParam("denom"));
        String strTmp = new String(getStrParam("inSequence"));
        if(strTmp.equals("true"))
            inSequence = true;
        strTmp = new String(getStrParam("bold"));
        if(strTmp.equalsIgnoreCase("true"))
            fontStyle = Font.BOLD;
        strTmp = new String(getStrParam("bgcolor"));
        try{
            myBGColor = new Color(parseRGB(strTmp));
        } catch (NumberFormatException e) {myBGColor =
Color.white; }
        setBackground(myBGColor);
        strTmp = new String(getStrParam("type"));
        try{
            intType = parseRGB(strTmp);
        } catch(NumberFormatException e) {intType = 4;}
        if(intType == 3)
            mainSetup();
        strTmp = new String(getStrParam("fgcolor"));
        try{
            myFGColor = new Color(parseRGB(strTmp));
        } catch (NumberFormatException e) {myFGColor =
Color.black;}
        try{
            fontSize = Integer.parseInt(getStrParam("size"));
        } catch(NumberFormatException e) {fontSize = 15;}
        try{
            if((value = (Float.valueOf(valueStr)).floatValue()) == 0) {
                value = 1f;
                valueStr = "1";
            }
        } catch (NumberFormatException e) {value = 1f; valueStr = "1";}
        if(denomStr.equalsIgnoreCase("NULL"))
            denomStr = "USD";
        for(int i = 0; i < denomArray.length; i++) {
            if(denomStr.equalsIgnoreCase(denomArray[i])) {
                selectedIndex = i;
                originalCurrencyValue = valueArray[i];
                break;
            }
        }
        strCurrency = denomStr;
        outStr = new String(denomStr +" "+ valueStr +" ");
        checkFontSize(outStr);
        repaint();
    }
    public final void setExchangeRate(String newDenom, float val) {
        val = value * val;
        val = (float)Math.round((double)(val*100f))/100;
        outStr newDenom +" "+ Float.toString(val) +" ";
        checkFontSize(outStr);
        strCurrency = newDenom;
        if(intType == 3)
            repaint(100,y-20,150,y);
        else
            repaint();
    }
    public final void setExchangeRate(Vector applets, int currentApp, String newDenom, float val) {
        setExchangeRate(newDenom, val);
```

-continued

```
        Applet current;
        for(int i = currentApp; i <= applets.size() - 1; i++) {
            current = (Applet)applets.elementAt(i);
            if((current != null) && (current instanceof numDisp)) {
                ((numDisp)current).setExchangeRate(applets, i + 1, newDenom, val);
                break;
            }
        }
    }
    public final void importRates() {
        String newRate;
        float value;
        int i = 0;
        try{
            URL url = new URL(getCodeBase() + "rates.data");
            DataInputStream inStream = new DataInputStream(uri.openStream());
            while((newRate = inStream.readLine()) != null) {
                try{
                    if((value = (Float.valueOf(newRate)).floatValue()) == 0) {
                        value = 1f;
                    }
                } catch (NumberFormatException e) {
                    value = 1f;
                    System.err.println("NumberFormatException: "+e);
                }
                valueArray[i++] = value;
            }
            ratesImported = true;
            inStream.close();
        } catch (MalformedURLException e) {
            System.err.println ("MalformedURLException: " + e);
        } catch (IOException e) {
            System.err.println("IOException: " + e);
        }
    }
    public final void setRates(float[] values, float num) {
        ratesImported true;
        originalCurrencyValue = num;
        valueArray = values;
    }
    private void selectNext() {
        selectedIndex++;
        if(selectedIndex >= denomArray.length)
            selectedIndex = 0;
        newValue = valueArray[selectedIndex] / originalCurrencyValue;
        setExchangeRate(denomArray[selectedIndex], newValue);
    }
    private void selectPrev() {
        selectedIndex--;
        if(selectedIndex < 0)
            selectedIndex = denomArray.length - 1;
        newValue = valueArray[selectedIndex] / originalCurrencyValue;
        setExchangeRate(denomArray[selectedIndex], newValue);
    }
    public boolean mouseDrag(Event evt, int x, int y) {
        if(intType > 3)
            return true;
        if(!ratesImported) {
            importRates ();
            originalCurrencyValue = valueArray[selectedIndex];
            Applet current;
            Enumeration e = getAppletContext().getApplets();
            while(e.hasMoreElements()) {
                current = (Applet)(e.nextElement());
                if((current != null) && (current instanceof numDisp))
                    ((numDisp)current).setRates(valueArray, originalCurrencyValue);
            }
        } else {
            mouseMoved = true;
            if(x >= (mouseX + 5)) {
                mouseX = x;
                selectNext();
            } else if(x <= (mouseX - 5)) {
                mouseX = x;
                selectPrev();
            }
        }
        return true;
    }
    public boolean mouseDown(Event evt, int x, int y) {
        mouseX = x;
        return true;
    }
    private Vector transEnum(Enumeration e) {
        Applet current;
        Vector list = new Vector();
        while(e.hasMoreElements()) {
            current = (Applet)(e.nextElement());
            if((current != null) && (current instanceof numDisp))
                list.addElement((numDisp)current);
        }
        return list;
    }
    public boolean mouseUp(Event evt, int x, int y) {
        if(mouseMoved) {
            mouseMoved = false;
            Applet current;
            float value = valueArray[selectedIndex] / originalCurrencyValue;
            if(appletList.size() == 0) {
                Enumeration e = getAppletContext().getApplets();
                appletList = transEnum(e);
            }
            for(int i = 0; i <= appletList.size() - 1; i++) {
                current = (Applet)appletList.elementAt(i);
                if((current != null) && (current instanceof numDisp)) {
                    if(inSequence) {
                        ((numDisp)current).setExchangeRate(appletList, i + 1, denomArray[selectedIndex], value);
                        break;
                    } else
                        ((numDisp) current).setExchangeRate(denomArray[selectedIndex], value);
                }
            }
        }
        return true;
    }
    public void paint(Graphics g) {
        if(intType == 3) {
            g.drawImage(TypeTwoImage, 0, 0, size().width, 100, this);
            g.setFont(f);
            g.setColor(Color.black);
            g.drawString(strCurrency, 100, y);
            g.setColor(Color.black);
            g.drawRect(0, 0, size().width - 1, size().height - 1);
            g.setColor(Color.gray);
            g.drawLine(o, size().height - 1, size ().width - 1, size().height - 1);
            g.drawLine(size().width - 1, 0, size().width - 1, size().height - 1);
        } else {
            g.setFont(f);
            g.setColor(myFGColor);
            g.drawString(outStr, 3, y);
        }
    }
}
```

| | |
|---|---|
| <PARAM NAME = "type" VALUE = "2" > | integer 2–4, default 4 |
| <PARAM NAME = "amount" VALUE = "59.95" > | any float, default 1.0 |
| <PARAM NAME= "denom" VALUE= "usd" > | any String, default USD |
| <PARAM NAME = "size" VALUE = "18" > | any integer >4, default 12 |
| <PARAM NAME= "bgcolor" VALUE= "0xaff" > | hexadecimal, octal or integer, default white |

-continued

```
<PARAM NAME = "fgcolor" VALUE= "0xff0000" >  hexadecimal,
octal or integer, default black
<PARAM NAME = "inSequence" VALUE = "true" >  boolean,
default false
<PARAM NAME = "bold" VALUE = "true" >        boolean,
default false
```

```
                    <HTML>
                    <HEAD>
                    <TITLE>Adsura Currency Converter Example 1
                    Demonstration</TITLE>
                    </HEAD>
                    <BODY>
                    <H2>Adsura Currency Converter Example 1
                    Demonstration</H2>
                    <P>
                    <br>
```

```
<br>
<P>
<APPLET CODE = "numDisp.class" WIDTH = 250 HEIGHT = 120>
<PARAM NAME = "denom" VALUE = "USD">
<PARAM NAME = "inSequence" VALUE = "true">
<PARAM NAME = "type" VALUE = "3">
</APPLET>
<P>
<br>
```

```
<br>
<P>
<APPLET CODE = "numDisp.class" WIDTH= 100 HEIGHT = 30>
<PARAM NAME = "amount" VALUE = "59.95">
<PARAM NAME = "size" VALUE = "18">
<PARAM NAME= "bgcolor" VALUE = "0xaff5">
<PARAM NAME = "fgcolor" VALUE = "0xff0000">
<PARAM NAME = "type" VALUE = "2">
<act denom = "USD", amount = "59.95">$59.95</act>
```

-continued

```
</APPLET>
<P>
<br>
```

```
<br>
<P>
<APPLET CODE = "numDisp.class" WIDTH = 80 HEIGHT = 25>
<PARAM NAME = "amount" VALUE = "150.90">
<PARAM NAME = "bgcolor" VALUE = "16711840">
<PARAM NAME = "type" VALUE = "2">
<PARAM NAME= "inSequence" VALUE = "true">
<act denom = "USD", amount = "150.90">USD$150.90</act>
</APPLET>
<P>
```

```
<br>
<P>
<APPLET CODE = "numDisp.class" WIDTH= 150 HEIGHT = 45>
<PARAM NAME= "amount" VALUE = "1.50">
<PARAM NAME = "size" VALUE = "24">
<PARAM NAME = "bgcolor" VALUE = "01110100">
<act denom = "USD", amount = "1.50">USD$1.50</act>
</APPLET>
<P>
<APPLET CODE = "numDisp.class" WIDTH= 100 HEIGHT = 30>
<PARAM NAME = "amount" VALUE = "1099.99">
<PARAM NAME = "denom" VALUE = "USD">
<PARAM NAME = "size" VALUE = "16">
<PARAM NAME = "fgcolor" VALUE = "01110100">
<act denom = "USD", amount = "1099.99">USD$1099.99</act>
</APPLET>
<P>
</BODY>
</HTML>
```

Begin File Listing: AdsuraException.h

```
#ifndef __ADSURAEXCEPTION_H
#define __ADSURAEXCEPTION_H
class CAdsuraException : public CException
{
   DECLARE_DYNCREATE(CAdsuraException)
public:
   CAdsuraException(int nCode = 0);
   ~CAdsuraException() {}
   int m_nErrorCode;
};
void ThrowAdsuraException(int nCode);
#endif
```

End File Listing: AdsuraException.h

Begin File Listing: AdsuraException.cpp

```
#include "stdafx.h"
#include "AdsuraException.h"
IMPLEMENT_DYNCREATE(CAdsuraException, CException)
```

-continued

```
CAdsuraException::CAdsuraException(int nCode)
   :m_nErrorCode(nCode)
{
}
void ThrowAdsuraException (int nCode)
{
   CAdsuraException* pEx = new
CAdsuraException(nCode);
   throw pEx;
}
End File Listing: AdsuraException.cpp Begin File Listing: AdsuraExchangeView.h if
!defined(AFX_ADSURAEXCHANGEVIEW_H_B8189F1A_CD0B_1
1D0_86E7_0000B43A75C9_INCLUDED_)
#define
AFX_ADSURAEXCHANGEVIEW_H_B8189F1A_CD0B_11D0_86E
7_0000B43A75C9_INCLUDED_
#if _MSC_VER >= 1000
#pragma once
#endif // MSC_VER >= 1000
// AdsuraExchangeView.h : main header file for
ADSURAEXCHANGEVIEW.DLL
#if !defined(_AFXCTL_H_)
    #error include 'afxctl.h' before including this file
#endif
#include "resource.h"       // main symbols
///////////////////////////////////////////////////
///////////////////////////
// CAdsuraExchangeViewApp: See AdsuraExchangeView.cpp
for implementation.
class CAdsuraExchangeViewApp : public COleControlModule
{
public:
   BOOL InitInstance();
   int ExitInstance();
};
extern const GUID CDECL _tlid
extern const WORD _wVerMajor;
extern const WORD _wVerMinor;
//{{AFX_INSERT_LOCATION}}
// Microsoft Developer Studio will insert additional
declarations immediately before the previous line.
endif //
!defined(AFX_ADSURAEXCHANGEVIEW_H_B8189F1A_CD0B_1
1D0_86E7_0000B43A75C9_INCLUDED)
End File Listing: AdsuraExchangeView.h Begin File Listing: AdsuraExchangeView.def ;AdsuraExchangeView.def : Declares the module parameters.
LIBRARY        "ADSURAEXCHANGEVIEW.OCX"
EXPORTS
   DllCanUnloadNow       @ 1 PRIVATE
   DllGetClassObject     @ 2 PRIVATE
   DllRegisterServer     @ 3 PRIVATE
   DllUnregisterServer   @ 4 PRIVATE
End File Listing: AdsuraExchangeView.def Begin File Listing: AdsuraExchangeView.cpp // AdsuraExchangeView.cpp : Implementation of
CAdsuraExchangeViewApp and DLL registration.
#include "stdafx.h"
#include "AdsuraExchangeView.h"
#ifdef _DEBUG
#define new DEBUG_NEW
#undef THIS_FILE
static char THIS_FILE[] = _FILE_;
#endif
CAdsuraExchangeViewApp NEAR theApp;
const GUID CDECL BASED_CODE _tlid =
   {0xb8189f11, 0xcd0b, 0x11d0, {0x86, 0xe7, 0, 0,
0xb4, 0x3a, 0x75, 0xc9}};
const WORD _wVerMajor = 1;
const WORD _wVerMinor = 0;
///////////////////////////////////////////////////
```

-continued

```
///////////////////////
// CAdsuraExchangeViewApp::InitInstance - DLL initialization
BOOL CAdsuraExchangeViewApp::InitInstance()
{
   BOOL bInit = COleControlModule::InitInstance();
   if (bInit)
   {
      // TODO: Add your own module initialization code
here.
   }
   return bInit;
}
/////////////////////////////////////////////////
///////////////////////
// CAdsuraExchangeViewApp::ExitInstance - DLL termination
int CAdsuraExchangeViewApp: :ExitInstance()
{
   // TODO: Add your own module termination code here.
   return COleControlModule::ExitInstance();
}
/////////////////////////////////////////////////
///////////////////////
// DllRegisterServer - Adds entries to the system registry
STDAPI   DllRegisterServer(void)
{
   AFX_MANAGE_STATE(_afxModuleAddrThis);
   if (!AfxOleRegisterTypeLb(AfxGetInstanceHandle(),
_tlid))
      return ResultFromScode(SELFREG_E_TYPELIB);
   if (!COleObjectFactoryEx::UpdateRegistryAll(TRUE))
      return ResultFromScode(SELFREG_E_CLASS);
   return NOERROR;
}
/////////////////////////////////////////////////
///////////////////////
// DllUnregisterServer - Removes entries from the system
registry
STDAPI DllUnregisterServer(void)
{
   AFX_MANAGE_STATE(_afxModuleAddrThis);
   if (!AfxOleUnregisterTypeLib(_tlid, _wVerMajor,
_wVerMinor))
      return ResultFromScode(SELFREG_E_TYPELIB);
   if (!COleObjectFactoryEx::UpdateRegistryAll(FALSE))
      return ResultFromScode(SELFREG_E_CLASS);
   return NOERROR;
};
End File Listing: AdsuraExchangeView.cpp Begin File Listing: AdsuraExchangeView.odl // AdsuraExchangeView.odl : type library source for ActiveX
Control project.
// This file will be processed by the Make Type Library
(mktyplib) tool to
// produce the type library (AdsuraExchangeView.tlb) that will
become a resource in
// AdsuraExchangeView.ocx.
#include <olectl.h>
#include <idispids.h>
u[uid(B8189F11-CD0B-11D0-86E7-0000B43A75C9),
version(1.0),
   helpfile("AdsuraExchangeView.hlp"),
   helpstring("AdsuraExchangeView ActiveX Control module"),
   control]
library ADSURAEXCHANGEVIEWLib
{
    importlib(STD0LE_TLB);
    importlib(STDTYPE_TLB);
    // Primary dispatch interface for
CAdsuraExchangeViewCtrl
    u[uid(B8189F12-CD0B-11D0-86E7-0000B43A75C9),
      helpstring("Dispatch interface for AdsuraExchangeView
Control"), hidden ]
    dispinterface _DAdsuraExchangeView
    {
        properties:
            // NOTE - ClassWizard will maintain
property information here.
```

-continued

```
            // Use extreme caution when editing this
section.
    // {{AFX_ODL_PROP(CAdsuraExchangeViewCtrl)
        [id(DISPID_READYSTATE), readonly] long
ReadyState;
        [id(1)] BSTR BaseValue;
        [id(2)] boolean DesignatedServer;
        [id(3)] BSTR BaseDenom;
        //}}AFX_ODL_PROP
      methods:
        // NOTE - ClassWizard will maintain
method information here.
        // Use extreme caution when editing this
section.
    // {{AFX_ODL_METHOD (CAdsuraExchangeViewCtrl)
        //}}AFX_ODL_METHOD
        [id(DISPID_ABOUTBOX)] void AboutBox();
    };
    // Event dispatch interface for
CAdsuraExchangeViewCtrl
  u[uid(B8189F13-CD0B-11D0-86E7-0000B43A75C9),
    helpstring("Event interface for AdsuraExchangeView
Control") ]
    dispinterface DAdsuraExchangeViewEvents
    {
      properties:
        // Event interface has no properties
      methods:
        // NOTE - ClassWizard will maintain event
information here.
        // Use extreme caution when editing this
section.
    // {{AFX_ODL_EVENT(CAdsuraExchangeViewCtrl)
        [id(DISPID_READYSTATECHANGE)] void
ReadyStateChange();
        //}}AFX_ODL_EVENT
    };
    // Class information for CAdsuraExchangeViewCtrl
  u[uid(B8189F14-CD0B-11D0-86E7-0000B43A75C9),
    helpstring("AdsuraExchangeView Control"), control ]
    coclass AdsuraExchangeView
    {
        [default] dispinterface _DAdsuraExchangeView;
        [default, source] dispinterface
_DAdsuraExchangeViewEvents;
    };
    // {{AFX_APPEND_ODL}}
    // }}AFX_APPEND_ODL}}
};
End File Listing: AdsuraExchangeView.odl Begin File Listing: AdsuraExchangeView.rc //Microsoft Developer Studio generated resource script.
//
#include "resource.h"
#define APSTUDIO_READ0NLY_SYMBOLS
/////////////////////////////////////////////////////////
/////////////////////////
//
// Generated from the TEXTINCLUDE 2 resource.
//
#include "afxres.h"
/////////////////////////////////////////////////////////
/////////////////////////
#undef APSTUDIO_READ0NLY_SYMBOLS
/////////////////////////////////////////////////////////
/////////////////////////
// English (Australia) resources
#if !defined(AFX_RESOURCE_DLL) || defined(AFX_TARG_ENA)
#ifdef _WIN32
LANGUAGE LANG_ENGLISH, SUBLANG_ENGLISH_AUS
#pragma code_page(1252)
#endif //_WIN32
#ifdef APSTUDIO_INVOKED
/////////////////////////////////////////////////////////
/////////////////////////
//
// TEXTINCLUDE
```

-continued

```
//
1 TEXTINCLUDE DISCARDABLE
BEGIN
   "resource.h\0"
END
2 TEXTINCLUDE DISCARDABLE
BEGIN
   "#include ""afxres.h+"\r\n"
   "\0"
END
3 TEXTINCLUDE DISCARDABLE
BEGIN
   "1 TYPELIB ""AdsuraExchangeView.tlb""\r\n"
END
#endif     // APSTUDIO_INVOKED
#ifndef _MAC
//////////////////////////////////////////////////
////////////////////////
//
// Version
//
VS_VERSION_INFO VERSIONINFO
FILEVERSION 1,0,0,1
PRODUCTVERSION 1,0,0,1
FILEFLAGSMASK 0x3fL
#ifdef _DEBUG
FILEFLAGS 0x1L
#else
FILEFLAGS 0x0L
#endif
FILEOS 0x4L
FILETYPE 0x2L
FILESUBTYPE 0x0L
BEGIN
   BLOCK "StringFileInfo"
   BEGIN
      BLOCK "040904B0"
      BEGIN
         VALUE "CompanyName", "CCCCC\0"
         VALUE "FileDescription", "AdsuraExchangeView
ActiveX Control Module\0"
         VALUE "FileVersion", "1, 0, 0, 1\0"
         VALUE "InternalName", "ADSURAEXCHANGEVIEW\0"
         VALUE "LegalCopyright", "Copyright (C) 1997\0"
         VALUE "LegalTrademarks", "\0"
         VALUE "OriginalFilename",
"ADSURAEXCHANGEVIEW.OCX\0"
         VALUE "ProductName", "AdsuraExchangeView ActiveX
Control Module\0"
         VALUE "ProductVersion", "1, 0, 0, 1\0"
         VALUE "OLESelfRegister", "\0"
      END
   END
   BLOCK "VarFileInfo"
   BEGIN
      VALUE "Translation", 0x409, 1200
   END
END
#endif // !_MAC
//////////////////////////////////////////////////
////////////////////////
//
// Icon
//
// Icon with lowest ID value placed first to ensure application
icon
// remains consistent on all systems.
IDI_ABOUTDLL          ICON DISCARDABLE
"AdsuraExchangeView.ico"
//////////////////////////////////////////////////
////////////////////////
//
// Bitmap
//
IDB_ADSURAEXCHANGEVIEW BITMAP DISCARDABLE
"AdsuraExchangeViewCtl.bmp"
//////////////////////////////////////////////////
////////////////////////
//
```

-continued

```
// Dialog
//
IDD_ABOUTBOX_ADSURAEXCHANGEVIEW DIALOG
DISCARDABLE 34, 22, 260, 55
STYLE DS_MODALFRAME | WS_POPUP | WS_CAPTION |
WS_SYSMENU
CAPTION "About AdsuraExchangeView Control"
FONT 8, "MS Sans Serif"
BEGIN
   ICON      IDI_ABOUTDLL,IDC_STATIC,10,10,20,20
   LTEXT     "AdsuraExchangeView Control, Version
1.0",IDC_STATIC,40,
          10,170,8
   LTEXT     "Copyright (C) 1997,
CCCCC"IDC_STATIC,40,25,170,8
   DEFPUSHBUTTON "OK",IDOK,221,7,32,14,WS_GROUP
END
IDD_PROPPAGE_ADSURAEXCHANGEVIEW DIALOG
DISCARDABLE 0, 0, 250, 62
STYLE WS_CHILD
FONT 8, "MS Sans Serif"
BEGIN
   LTEXT     "TODO: Place controls to manipulate
properties of AdsuraExchangeView Control on this dialog.",
          IDC_STATIC,7,25,229,16
END
//////////////////////////////////////////////////
///////////////////////
//
// DESIGNINFO
//
ifdef APSTUDIO_INVOKED
GUIDELINES DESIGNINFO DISCARDABLE
BEGIN
  IDD_ABOUTBOX_ADSURAEXCHANGEVIEW, DIALOG
  BEGIN
    LEFTMARGIN, 7
    RIGHTMARGIN, 253
    TOPMARGIN, 7
    BOTTOMMARGIN, 48
  END
  IDD_PROPPAGE_ADSURAEXCHANGEVIEW, DIALOG
  BEGIN
    LEFTMARGIN, 7
    RIGHTMARGIN, 243
    TOPMARGIN, 7
    BOTTOMMARGIN, 55
  END
END
#endif // APSTUDIO_INVOKED
//////////////////////////////////////////////////
///////////////////////
//
// StringTable
//
STRINGTABLE DISCARDABLE
BEGIN
   IDS_ADSURAEXCHANGEVIEW "AdsuraExchangeView
Control"
   IDS_ADSURAEXCHANGEVIEW_PPG "AdsuraExchangeView
Property Page"
END
STRINGTABLE DISCARDABLE
BEGIN
   IDS_ADSURAEXCHANGEVIEW_PPG_CAPTION "General"
END
#endif // English (Australia) resources
//////////////////////////////////////////////////
///////////////////////
#ifndef APSTUDIO_INVOKED
//////////////////////////////////////////////////
///////////////////////
//
// Generated from the TEXTINCLUDE 3 resource.
//
1 TYPELIB "AdsuraExchangeView.tlb"
//////////////////////////////////////////////////
///////////////////////
#endif // not APSTUDIO_INVOKED
```

-continued

End File Listing: AdsuraExchangeView.rc

Begin File Listing: AdsuraExchangeViewCtl.h

```
#if
!defined(AFX_ADSURAEXCHANGEVIEWCTL_H_B8189F22_CD0
B_11D0_86E7_0000B43A75C9_INCLUDED_)
#define
AFX_ADSURAEXCHANGEVIEWCTL_H_B8189F22_CD0B_11D0_
86E7_0000B43A75C9_INCLUDED_
#if _MSC_VER >= 1000
#pragma once
#endif// _MSC_VER >= 1000
// AdsuraExchangeViewCtl.h : Declaration of the
CAdsuraExchangeViewCtrl ActiveX Control class.
/////////////////////////////////////////////////////
////////////////////////
// CAdsuraExchangeViewCtrl : See
AdsuraExchangeViewCtl.cpp for implementation.
class CAdsuraExchangeViewCtrl : public COleControl
{
    DECLARE_DYNCREATE(CAdsuraExchangeViewCtrl)
// Constructor
public:
    CAdsuraExchangeViewCtrl();
// Overrides
    // ClassWizard generated virtual function overrides
    // {{AFX_VIRTUAL(CAdsuraExchangeViewCtrl)
    public:
    virtual void OnDraw(CDC* pdc, const CRect& rcBounds,
const CRect& rcInvalid);
    virtual void DoPropExchange(CPropExchange* pPX);
    virtual void OnResetState();
    virtual DWORD GetControlFlags();
    //}}AFX_VIRTUAL
// Implementation
protected:
    CString GetConversionRate();
    ~CAdsuraExchangeViewCtrl();
    DECLARE_OLECREATE_EX(CAdsuraExchangeViewCtrl)
// Class factory and guid
    DECLARE_OLETYPELIB(CAdsuraExchangeViewCtrl)
// GetTypeInfo
    DECLARE_PROPPAGEIDS(CAdsuraExchangeViewCtrl)
// Property page IDs
    DECLARE_OLECTLTYPE(CAdsuraExchangeViewCtrl)
    // Type name and misc status
// Message maps
    // {{AFX_MSG(CAdsuraExchangeViewCtrl)
        // NOTE - ClassWizard will add and remove
member functions here.
        // DO NOT EDIT what you see in these blocks
of generated code !
    //}}AFX_MSG
    DECLARE_MESSAGE_MAP()
// Dispatch maps
    // {{AFX_DISPATCH(CAdsuraExchangeViewCtrl)
    afx_msg BSTR GetBaseValue();
    afx_msg void SetBaseValue(LPCTSTR lpszNewValue);
    afx_msg BOOL GetDesignatedServer();
    afx_msg void SetDesignatedServer(BOOL bNewValue);
    afx_msg BSTR GetBaseDenom();
    afx_msg void SetBaseDenom(LPCTSTR lpszNewValue);
    //}}AFX_DISPATCH
    DECLARE_DISPATCH_MAP()
    afx_msg void AboutBox();
// Event maps
    // {{AFX_EVENT(CAdsuraExchangeViewCtrl)
    //}}AFX_EVENT
    DECLARE_EVENT_MAP()
// Dispatch and event IDs
public:
    CString m_strValue;
    BOOL m_bDesignatedServer;
    BOOL GetExchangeRateFile(Cstring strRateFile);
    CString m_strBaseDenom;
    enum {
    // {{AFX_DIS_ID(CAdsuraExchangeViewCtrl)
    dispidBaseValue = 1L,
```

-continued

```
    dispidDesignatedServer = 2L,
    dispidBaseDenom = 3L,
  //}}AFX_DISP_ID
    };
};
//{{AFX_INSERT_LOCATION}}
// Microsoft Developer Studio will insert additional
declarations immediately before the previous line.
endif //
!defined(AFX_ADSURAEXCHANGEVIEWCTL_H_B8189F22_CD0
B_11D0_86E7_0000B43A75C9_INCLUDED)
```

End File Listing: AdsuraExchangeViewCtl.h

Begin File Listing: AdsuraExchangeViewCtl.cpp

```
// AdsuraExchangeViewCtl.cpp : Implementation of the
CAdsuraExchangeViewCtrl ActiveX Control class.
#include "stdafx.h"
#include "AdsuraExchangeView.h"
#include "AdsuraExchangeViewCtl.h"
#include "AdsuraExchangeViewPpg.h"
#include "AdsuraException.h"
#include <afxinet.h>
#include <iostream.h>
#ifdef _DEBUG
#define new DEBUG_NEW
#undef THIS_FILE
static char THIS_FILE[] = _FILE_;
#endif
static int _ExchangeRate = 1;
static BOOL _ServerSet = 0;
static BOOL _RatesObtained = 0;
static BOOL _bNoFile = 0;
static CString _strRates;
IMPLEMENT_DYNCREATE(CAdsuraExchangeViewCtrl,
COleControl)
/////////////////////////////////////////////////
/////////////////////
// Message map
BEGIN_MESSAGE_MAP(CAdsuraExchangeViewCtrl,
COleControl)
    //{{AFX_MSG_MAP(CAdsuraExchangeViewCtrl)
    // NOTE - ClassWizard will add and remove message
map entries
    // DO NOT EDIT what you see in these blocks of
generated code !
    //}}AFX_MSG_MAP
    ON_OLEVERB(AFXIDS_VERB_PROPERTIES,
OnProperties)
END_MESSAGE_MAP()
/////////////////////////////////////////////////
/////////////////////
// Dispatch map
BEGIN_DISPATCH_MAP(CAdsuraExchangeViewCtrl,
COleControl
    // {{AFX_DISPATCH_MAP(CAdsuraExchangeViewCtrl)
    DISP_PROPERTY_EX(CAdsuraExchangeViewCtrl,
"BaseValue", GetBaseValue, SetBaseValue, VT_BSTR)
    DISP_PROPERTY_EX(CAdsuraExchangeViewCtrl,
"DesignatedServer", GetDesignatedServer,
SetDesignatedServer VT_BOOL)
    DISP_PROPERTY_EX(CAdsuraExchangeViewCtrl,
"BaseDenom", GetBaseDenom, SetBaseDenom VT_BSTR)
    DISP_STOCKPROP_READYSTATE()
    //}}AFX_DISPATCH_MAP
    DISP_FUNCTION_ID(CAdsuraExchangeViewCtrl,
"AboutBox", DISPID_ABOUTBOX, AboutBox, VT_EMPTY,
VTS_NONE)
END_DISPATCH_MAP()
/////////////////////////////////////////////////
/////////////////////
// Event map
BEGIN_EVENT_MAP(CAdsuraExchangeViewCtrl, COleControl)
    // {{AFX_EVENT MAP(CAdsuraExchangeViewCtrl)
    // NOTE - ClassWizard will add and remove event map
entries
    // DO NOT EDIT what you see in these blocks of
generated code
    EVENT_STOCK_READYSTATECHANGE()
```

-continued

```
  //{{AFX_EVENT_MAP
END_EVENT_MAP()
//////////////////////////////////////////////////
///////////////////////
// Property pages
// TODO Add more property pages as needed. Remember to
increase the count!
BEGIN_PPOPPAGEIDS(CAdsuraExchangeViewCtrl, 1)
   PROPPAGEID(CAdsuraExchangeViewPropPage::guid)
END_PROPPAGEIDS(CAdsuraExchangeViewCtrl)
//////////////////////////////////////////////////
///////////////////////
// Initialize class factory and guid
IMPLEMENT_OLECREATE_EX(CAdsuraExchangeViewCtrl,
"ADSURAEXCHANGEVIEW.AdsuraExchangeViewCtrl.1",
   0xb8189f14, 0xcd0b, 0x11d0, 0x86, 0xe7, 0, 0, 0xb4,
0x3a, 0x75, 0xc9)
//////////////////////////////////////////////////
///////////////////////
// Type library ID and version
IMPLEMENT_OLETYPELIB(CAdsuraExchangeViewCtrl _tlid
_wVerMajor, _wVerMinor)
//////////////////////////////////////////////////
///////////////////////
// Interface IDs
const IID BASED_CODE IID_DAdsuraExchangeView =
      {0xb8189f12, 0xcd0b, 0x11d0, {0x86, 0xe7, 0, 0,
0xb4, 0x3a, 0x75, 0xc9}};
const IID BASED_CODE IID_DAdsuraExchangeViewEvents =
      {0xb8189f13, 0xcd0b, 0x11d0, {0x86, 0xe7, 0, 0,
0xb4, 0x3a, 0x75, 0xc9}};
//////////////////////////////////////////////////
///////////////////////
// Control type information
static const DWOPD BASED_CODE
_dwAdsuraExchangeViewOleMisc =
   OLEMISC_ACTIVATEWHENVISIBLE |
   OLEMISC_SETCLIENTSITEFIRST |
   OLEMISC_INSIDEOUT |
   OLEMISC_CANTLINKINSIDE |
   OLEMISC_RECOMPOSEONRESIZE;
IMPLEMENT_OLECTLTYPE(CAdsuraExchangeViewCtrl,
IDS_ADSURAEXCHANGEVIEW,
_dwAdsuraExchangeViewOleMisc)
//////////////////////////////////////////////////
///////////////////////
//
CAdsuraExchangeViewCtrl::CAdsuraExchangeViewCtrlFactory::
UpdateRegistry -
// Adds or removes system registry entries for
CAdsuraExchangeViewCtrl
BOOL
CAdsuraExchangeViewCtrl::CAdsuraExchangeViewCtrlFactory::
UpdateRegistry(BOOL bRegister)
{
   // TODO: Verify that your control follows apartment-
model threading rules.
   // Refer to MFC TechNote 64 for more information.
   // If your control does not conform to the apartment-
model rules, then
   // you must modify the code below, changing the 6th
parameter from
   // afxRegApartmentThreading to 0.
   if (bRegister)
      return AfxOleRegisterControlClass(
         AfxGetInstanceHandle(),
         m_clsid,
         m_lpszProgID,
         IDS_ADSURAEXCHANGEVIEW,
         IDB_ADSURAEXCHANGEVIEW,
         afxRegApartmentThreading,
         _dwAdsuraExchangeViewOleMisc,
         _tlid,
         _wVerMajor,
         _wVerMinor);
   else
      return AfxOleUnregisterClass(m_clsid,
m_lpszProgID);
}
```

-continued

```
////////////////////////////////////////////////
/////////////////////////
// CAdsuraExchangeViewCtrl::CAdsuraExchangeViewCtrl -
Constructor
CAdsuraExchangeViewCtrl::CAdsuraExchangeViewCtrl()
{
   InitializeTIDs(&IID_DAdsuraExchangeView,
&IID_DAdsuraExchangeViewEvents);
   m_lReadyState = READYSTATE_LOADING;
   // TODO: Call InternalSetReadyState when the
readystate changes.
   // TODO: Initialize your control's instance data here.
}
////////////////////////////////////////////////
/////////////////////////
// CAdsuraExchangeViewCtrl::~CAdsuraExchangeViewCtrl -
Destructor
CAdsuraExchangeViewCtrl::~CAdsuraExchangeViewCtrl()
{
   // TODO: Cleanup your control's instance data here.
}
////////////////////////////////////////////////
/////////////////////////
// CAdsuraExchangeViewCtrl::OnDraw - Drawing function
void CAdsuraExchangeViewCtrl::OnDraw(CDC* pdc, const
CRect& rcBounds, const CRect& rcInvalid)
{
   if(m_bDesignatedServer && _RatesObtained == FALSE)
      {
      WORD wMachineNationality =
LANGIDFROMLCID (GetsystemDefaultLCID());
      char szFile[33];
      ltoa((long)wMachineNationality,szFile,10);
      if(!GetExchangeRateFile(szFile))
         {
         _bNoFile = TRUE;
      TRACE("Unable to retrieve Exchange Rate File\n");
         }
      }
if(!_bNoFile)
   {
         CString strRate(GetConversionRate());
         float fBase = (float)
atof(m_strValue.GetBuffer(1));
         float fRate = (float)
atof(strRate.GetBuffer(1));
         float fConverted = fBase/fRate;
         CString strConverted;
         strConverted.Format("%f",fConverted);
         // Now, need to convert the Base Rate
by the Conversion Rate
         int nSize =
GetCurrencyFormat(NULL, LOCALE_NOUSEROYERRIDE, strCo
nverted,NULL,0,0);
         TCHAR *szCurrency = new
TCHAR[nSize];
      GetCurrencyFormat(NULL,LOCALE_NOUSEROVERRIDE,
strConverted,NULL,szCurrency,nSize);
         pdc->TextOut(0,0,szCurrency);
         delete[] szCurrency;
   }
   else
   {
   //NOTE: Actually show default values set into the HTML
   pdc->TextOut(0,0,"Error !!");
   }
}
////////////////////////////////////////////////
/////////////////////////
// CAdsuraExchangeViewCtrl::DdPropExchange - Persistence
support
void
CAdsuraExchangeViewCtrl::DoPropExchange(CPropExchange*
pPX)
{
   ExchangeVersion(pPX, MAKELONG(_wVerMinor,
_wVerMajor));
   COleControl::DoPropExchange(pPX);
   if (pPX->IsLoading())
```

-continued

```
    InternalSetReadyState(READYSTATE_LOADING);
  PX_String(pPX, _T("BaseValue"),m_strValue ,"0.0");
  PX_Bool(pPX,
_T("DesignatedServer"),m_bDesignatedServer , FALSE);
  PX_String(pPX,
_T("BaseDenom")m_strBaseDenom,"USD");
}
///////////////////////////////////////////////////
/////////////////////////
// CAdsuraExchangeViewCtrl::GetControlFlags -
// Flags to customize MFC's implementation of ActiveX
controls.
//
// For information on using these flags, please see MFC
technical note
// #nnn, "Optimizing an ActiveX Control".
DWORD CAdsuraExchangeViewCtrl::GetControlFlags()
{
  DWORD dwFlags = COleControl::GetControlFlags();
  // The control will not be redrawn when making the
transition
  // between the active and inactivate state.
  dwFlags |= noFlickerActivate;
  // The control can optimize its OnDraw method, by not
restoring
  // the original GDI objects in the device context.
  dwFlags |= canOptimizeDraw;
  return dwFlags;
}
///////////////////////////////////////////////////
/////////////////////////
// CAdsuraExchangeViewCtrl::OnResetState - Reset control
to default state
void CAdsuraExchangeViewCtrl:OnResetState()
{
  COleControl::OnResetState(); // Resets defaults found
in DoPropExchange
  // TODO: Reset any other control state here.
}
///////////////////////////////////////////////////
/////////////////////////
// CAdsuraExchangeViewCtrl::AboutBox - Display an "About"
box to the user
void CAdsuraExchangeViewCtrl::AboutBox()
{
  CDialog
dlgAbout(IDD_ABOUTBOX_ADSURAEXCHANGEVIEW);
  dlgAbout.DoModal();
}
///////////////////////////////////////////////////
/////////////////////////
// CAdsuraExchangeViewCtrl message handlers
BSTR QAdsuraExchangeViewCtrl::GetBaseValue()
{
  CString strResult(m_strValue);
  return strResult.AllocSysString();
}
void CAdsuraExchangeViewCtrl::SetBaseValue(LPCTSTR
lpszNewValue)
{
  m_strValue = lpszNewValue;
  Invalidate(FALSE);
  SetModifiedFlag();
}
BOOL CAdsuraExchangeViewCtrl::GetDesignatedServer()
{
  return m_bDesignatedServer;
}
void CAdsuraExchangeViewCtrl::SetDesignatedServer(BOOL
bNewValue)
{
  if(bNewValue && ! _ServerSet)
    {
      m_bDesignatedServer = TRUE;
      _ServerSet = TRUE;
      SetModifiedFlag();
      return;
    }
  if(bNewValue && _ServerSet)
```

-continued

```
    {
        AfxMessageBox("There is already a server set for
this page");
        return;
    }
    if(!bNewValue && m_bDesignatedServer)
    {
        m_bDesignatedServer = FALSE;
        _ServerSet = FALSE;
        SetModifiedFlag();
    }
}
BSTR CAdsuraExchangeViewCtrl::GetBaseDenom()
{
    CString strResult(m_strBaseDenom);
    return strResult.AllocSysString();
}
void CAdsuraExchangeViewCtrl::SetBaseDenom(LPCTSTR
lpszNewValue)
{
//Check to ensure that it is a used value
    //(eg. USD AUD STLG)
    CString strTest(lpszNewValue);
    if(strTest.Compare("USD") == 0 ||
strTest.Compare("AUD") == 0 || strTest.Compare("STLG") ==
0)
    {
        m_strBaseDenom = lpszNewValue;
        SetModifiedFlag();
    }
    else AfxMessageBox("Please use one of the following
codes only: AUD,STLG or USD");
}
///////////////////////////////////////////////////////
///////////////////////////
// HTTP Functionality
// determine number of elements in an array (not bytes)
#define _countof(array) (sizeof(array) / sizeof(array[0]))
DWORD dwHttpRequestFlags =
INTERNET_FLAG_EXISTING_CONNECT |
INTERNET_FLAG_NO_AUTO_REDIRECT;
const TCHAR szHeaders[] = _T("Accept: text/*\r\nUser-Agent:
Adsura ActiveX Exchanger Version 1.0\r\n");
BOOL
CAdsuraExchangeViewCtrl::GetExchangeRateFile(Cstring
strRateFile)
{
    char szURL[INTERNET_MAX_URL_LENGTH];
wsprintf(szURL, "http://sabre/webfiles/%s.txt",strRateFile.Ge
tBuffer(1));
    BOOL bRet = TRUE;
    CInternetSession session(_T("Adsura Exchanger ActiveX
Control"),1, PRE_CONFIG_INTERNET_ACCESS);
    CHttpConnection* pServer = NULL;
    CHttpFile* pFile = NULL;
    try
    {
        // check to see if this is a reasonable URL
        CString strServerName;
        CString strObject;
        INTERNET_PORT nPort;
        DWORD dwServiceType;
        if (!AfxParseURL(szURL, dwServiceType,
strServerName, strObject, nPort)
        dwServiceType != INTERNET_SERVICE_HTTP)
        {
            cerr << _T("Error: can only use URLs
beginning with http://") << endl;
            ThrowAdsuraException(1);
        }
        pServer =
session.GetHttpConnection (strServerName, nPort);
        pFile = pServer-
>OpenRequest(CHttpconnection::HTTP_VERB_GET,
            strObject, NULL, 1, NULL, NULL,
dwHttpRequestFlags);
        pFile->AddRequestHeaders(szHeaders);
        pFile->SendRequest();
        DWORD dwRet;
```

-continued

```
        pFile->QueryInfoStatusCode(dwRet);
        if (dwRet == HTTP_STATUS_DENIED)
        {
            cerr << _T("Access denied: Invalid
password\n");
            ThrowAdsuraException(1);
        }
        CString strNewLocation;
        pFile-
>QueryInfo(HTTP_QUERY_RAW_HEADERS_CRLF,
strNewLocation);
        // were we redirected?
    if(dwRet != HTTP_STATUS_OK)
        {
            TRACE1("Status Code is %li",dwRet);
            ThrowAdsuraException(1);
        }
CString strTempRates("");
        TCHAR sz[1024];
        while (pFile->ReadString(sz, 1023) &&
!_RatesObtained)
        {
            strTempRates += sz;
        }
        if(!_RatesObtained)
        {
            _RatesObtained = TRUE;
            _strRates = strTempRates;
        }
        TRACE("Obtained File\n");
        pFile->Close();
        pserver->Close();
    }
    catch (CInternetException* pEx)
    {
        // catch errors from WinINet
        TCHAR szErr[1024];
        pEx->GetErrorMessage(szErr, 1024);
        cerr << _T("Error: (") <<pEx->m_dwError < _T(") ");
        cerr << szErr << endl;
        pEx->Delete();
        bRet = FALSE;
    }
    catch (CAdsuraException* pEx)
    {
        // catch things wrong with parameters, etc
        TRACE1("Error: Exiting with
CAdsuraException(%d)\n", pEx->m_nErrorCode);
        pEx->Delete();
        bRet = FALSE;
    }
    if (pFile != NULL)
        delete pFile;
    if (pServer != NULL)
        delete pServer;
    session.Close();
    return(bRet);
}
CString CAdsuraExchangeViewCtrl::GetConversionRate()
{
// Get the conversion rate from the file
    //If it doesnt find it then it is either the same currency
or not a supported currenct, therefore use default in either
case
    char *p = NULL;
    p = strstr(
_strRates.GetBuffer(1),m_strBaseDenom.GetBuffer(1));
        if(p == NULL) return("1.0");
        //Now strip out the required data
        for(int i = 0; i < 3 && p != NULL; i++)
        {
            p++;
    p = strchr(p,'~');
        }
        p++;
        //Now, p should be sitting at the beginning of the
conversion rate
        char *pEnd = strchr(p,'~');
        *pEnd ='\0';
```

-continued

```
    Cstring strRet(p);
    *pEnd ='~';
    return(strRet);
}
End File Listing: AdsuraExchangeViewCtl.cpp Begin File Listing: AdsuraExchangeViewPpg.h if
!defined(AFX_ADSURAEXCHANGEVIEWPPG_H_B8189F24_CD
0B_11D0_86E7_0000B43A75C9_INCLUDED_)
#define
AFX_ADSURAEXCHANGEVIEWPPG_H_B8189F24_CD0B_11D0
_86E7_0000B43A75C9_INCLUDED_
#if_MS6_VER >= 1000
#pragma once
#endif // MSC_VER >= 1000
// AdsuraExchangeViewPpg.h : Declaration of the
CAdsuraExchangeViewPropPage property page class.
///////////////////////////////////////////////////
//////////////////////
// CAdsuraExchangeViewPropPage : See
AdsuraExchangeViewPpg.cpp.cpp for implementation.
class CAdsuraExchangeViewPropPage : public
COlePropertyPage
{
    DECLARE_DYNCREATE(CAdsuraExchangeViewPropPage)
    DECLARE_OLECREATE_EX(CAdsuraExchangeViewPropP
age)
// Constructor
public:
    CAdsuraExchangeViewPropPage();
// Dialog Data
    // {{AFX_DATA(CAdsuraExchangeViewPropPage)
    enum {IDD =
IDD_PROPPAGE_ADSURAEXCHANGEVIEW };
        // NOTE - ClassWizard will add data members
here.
        // DO NOT EDIT what you see in these blocks
of generated code !
    //}}AFX_DATA
// Implementation
protected:
    virtual void DoDataExchange(cDataExchange* PDX);
// DDX/DDV support
// Message maps
protected:
    // {{AFX_MSG(CAdsuraExchangeViewPropPage)
        // NOTE - ClassWizard will add and remove
member functions here.
        // DO NOT EDIT what you see in these blocks
of generated code !
    //}}AFX_MSG
    DECLARE_MESSAGE_MAP()
};
//{{AFX_INSERT_LOCATION}}
// Microsoft Developer Studio will insert additional
declarations immediately before the previous line.
endif //
!defined(AFX_ADSURAEXCHANGEVIEWPPG_H_B8189F24_CD
0B_11D0_86E7_0000B43A75C9_INCLUDED)
End File Listing: AdsuraExchangeViewPpg.h Begin File Listing: AdsuraExchangeViewPpg.cpp if
!defined(AFX_ADSURAEXCHANGEVIEWPPG_H_B8189F24_CD
0B_11D0_86E7_0000B43A75C9_INCLUDED)
#define
AFX_ADSURAEXCHANGEVIEWPPG_H_B8189F24_CD0B_11D0
_86E7_0000B43A75C9_INCLUDED_
#if _MSC_VER >= 1000
#pragma once
#endif// MSC_VER >= 1000
// AdsuraExchangeViewPpg.h : Declaration of the
CAdsuraExchangeViewPropPage property page class.
///////////////////////////////////////////////////
//////////////////////
// CAdsuraExchangeViewPropPage : See
```

-continued

AdsuraExchangeViewPpg.cpp.cpp for implementation.
class CAdsuraExchangeViewPropPage : public
COlePropertyPage
{
  DECLARE_DYNCREATE(CAdsuraExchangeViewPropPage)
  DECLARE_OLECREATE_EX(CAdsuraExchangeViewPropP
age)
// Constructor
public:
  CAdsuraExchangeViewPropPage();
// Dialog Data
  // {{AFX_DATA(CAdsuraExchangeViewPropPage)
  enum {IDD =
IDD_PROPPAGE_ADSURAEXCHANGEVIEW };
    // NOTE - ClassWizard will add data members
here.
    // DO NOT EDIT what you see in these blocks
of generated code !
  //}}AFX_DATA
// Implementation
protected:
  virtual void DoDataExchange(CDataExchange* pDX);
// DDX/DDV support
// Message maps
protected:
  // {{AFX_MSG(CAdsuraExchangeViewPropPage)
    // NOTE - ClassWizard will add and remove
member functions here.
    // DO NOT EDIT what you see in these blocks
of generated code !
  //}}AFX_MSG
  DECLARE_MESSAGE_MAP()
};
//{{AFX_INSERT_LOCATION}}
// Microsoft Developer Studio will insert additional
declarations immediately before the previous line.
endif //
!defined(AFX_ADSURAEXCHANGEVIEWPPG_H_B8189F24_CD
0B_11D0_86E7_0000B43A75C9_INCLUDED)
End File Listing: AdsuraExchangeViewPpg.cpp Begin File Listing: resource.h // {{NO_DEPENDENCIES}}
// Microsoft Developer Studio generated include file.
// Used by AdsuraExchangeView.rc
define IDS_ADSURAEXCHANGEVIEW    1
define IDD_ABOUTBOX_ADSURAEXCHANGEVIEW 1
define IDB_ADSURAEXCHANGEVIEW    1
define IDI_ABOUTDLL    1
define IDS_ADSUPAEXCHANGEVIEW_PPG    2
define IDS_ADSURAEXCHANGEVIEW_PPG_CAPTION 200
define IDD_PROPPAGE_ADSURAEXCHANGEVIEW 200
defineIDC_CUSTOM1    201
// Next default values for new objects
//
ifdef APSTUDIO_INVOKED
ifndef APSTUDIO_READONLY_SYMBOLS
define _APS_NEXT_RESOURCE_VALUE    201
define _APS_NEXT_COMMAND_VALUE    32768
define _APS_NEXT_CONTROL_VALUE    202
define _APS_NEXT_SYMED_VALUE    101
endif
endif
End File Listing: resource.h Begin File Listing: StdAfx.h if
!defined(AFX_STDAFX_H_B8189F18_CD0B_11D0_86E7_0000B4
3A75C9_INCLUDED_)
define
AFX_STDAFX_H_B8189F18_CD0B_11D0_86E7_0000B43A75C9_
_INCLUDED_
if_MSC_VER >= 1000
pragma once
endif// _MSC_VER>= 1000
// stdafx.h : include file for standard system include files,
//    or project specific include files that are used frequently, -continued

```
//    but are changed infrequently
#define VC_EXTRALEAN          // Exclude rarely-used
stuff from Windows headers
#include <afxctl.h>           // MFC suppoft for ActiveX Controls
// Delete the two includes below if you do not wish to use the
MFC
// database classes
#include <afxdb.h>             // MFC database classes
#include <afxdao.h>            // MFC DAO database
classes
//{{AFX_INSERT_LOCATION}}
// Microsoft Developer Studio will insert additional
declarations immediately before the previous line.
endif //
!defined(AFX_STDAFX_H_B8189F18_CD0B_11D0_86E7_0000B4
3A75C9__INCLUDED_)
End File Lsting: StdAfx.h Begin File Listing: StdAfx.h if
!defined(AFX_STDAFX H_B8189F18_CD0B_11D0_86E7_0000B4
3A75C9__INCLUDED_)
#define
AFX_STDAFX_H_B8189F18_CD0B_11D0_86E7_0000B43A75C9_
_INCLUDED_
if_MSC_VER >= 1000
pragma once
#endif // MSC_VER >= 1000
// stdafx.h : include file for standard system include files,
//    or project specific include files that are used frequently,
//    but are changed infrequently
#define VC_EXTRALEAN          // Exclude rarely-used
stuff from Windows headers
#include <afxctl.h>           // MFC support for ActiveX Controls
// Delete the two includes below if you do not wish to use the
MFC
// database classes
#include <afxdb.h>             // MFC database classes
#include <afxdao.h>            // MFC DAO database
classes
//{{AFX_INSERT_LOCATION}}
// Microsoft Developer Studio will insert additional
declarations immediately before the previous line.
endif //
!defined(AFX_STDAFX_H_B8189F18_CD0B_11D0_86E7_0000B4
3A75C9__INCLUDED_)
End File Listing: StdAfx.h
```

Begin File Listing: Example.htm

```
<!DOCTYPE HTML PUBLIC "-/ /IETF/ /DTD HTML/ /EN">
<html>
<head>
<meta http-equiv="Content-Type"
content="text/html; charset=iso-8859-1">
<meta name="GENERATOR" content="Microsoft FrontPage
2.0">
<title> Adsura Currency Converter Example 2
Demonstration</title>
</head>
<bodybgcolor="#FFFFFF">
<p align="center"><font size="5"
face="Arial"><strong><u>Active X
Test Page</u></strong></font></p>
<p align="center"> </p>
<p align="left"><object
classid="clsid:B8189F14-CD0B-11D0-86E7-0000B43A75C9"
codebase="http:/ /203.23.147.38/testweb/ax/AdsuraExchange
View.ocx"
align="baseline" border="0" width="83" height="23"><param
name="_Version" value="65536"><param name="_ExtentX"
value="2187"><param
```

-continued

```
name="_ExtentY" value="600"><param name="_StockProps"
value="0"><param
name="BaseValue" value="35"><param
name="DesignatedServer"
value="-1"><param name="BaseDenom" value="AUD">
<act denom ="AUD", amount = "35.00">AUD$35.00</act>
</object></p>
<p align="left"><object
classid="clsid:B8189F14-CD0B-11D0-86E7-0000B43A75C9"
align="baseline" border="0" width="83" height="23"><param
name="_Version" value="65536"><param name="_ExtentX"
value="2187"><param
name="_ExtentY" value="600"><param name="_StockProps"
value="0"><param
name="BaseValue" value="156"><param name="BaseDenom"
value="AUD">
<act denom = "AUD", amount = "156.00">AUD$156.00</act>
</object></p>
<p align="left"><object
classid="clsid:B8189F14-CD0B-11D0-86E7-0000B43A75C9"
align="baseline" border="0" width="83" height="23"><param
name="_Version" value="65536"><param name="_ExtentX"
value="2187"><param
name="_ExtentY" value="600"><param name="_StockProps"
```

-continued

```
value="0"><param
name="BaseValue" value="445"><param name="BaseDenom"
value="AUD">
<act denom = "AUD", amount = "445.00">AUD$445.00</act>
</object></p>
<p align="left"> </p>
<p align="left"> </p>
<p align="left"> </p>
</body>
</html>
End File Listing: Example.htm
```

Begin File Listing: Parse.html

```
<!DOCTYPE HTML PUBLIC "-/ /IETF/ /DTD HTML/ /EN">
<html>
<head>
<meta http-equiv="Content-Type"
content="text/html; charset=iso-8859-1">
<title>Adsura Currency Converter Example Three
Demonstration</title>
</head>
<bodybgcolor="#FFFFFF">
<p>Example Three.
<br>
```

-continued

This page demonstrates the implementation of the Currency Selection, Exchange Rate Retrieval and Price Display Object (2) in Example Three. The Currency Selection, Exchange Rate Retrieval and Price Display Object (2) in Example Three is able to demonstrate its currency conversion with the Hypertext Markup Language (HTML) files provided for Example One and Example Two, demonstrating that the same document or environment can support multiple currency conversion implementations </p>
<br>
<p>The following are prices whose default currency is the US dollar</p>
<br>
<p><act denom ="USD", amount ="100">$100</act></p>
<br>
<p><act denom = "USD", amount = "230.05">$230.05</act></p>
<br>
<p><act denom = "USD", amount = "99.87">$99.87</act></p>
<br>

---

```
Begin File Listing: EBrowse.java
//**********************************************************
*****
// EBrowse.java: Applet
//
//**********************************************************
*****
import java.applet.*;
import java.awt.*;
import EBrowseFrame;
//==========================================================
===========================
// Main Class for applet EBrowse
//
//==========================================================
===========================
public class EBrowse extends Applet
{
    // STANDALONE APPLICATION SUPPORT:
    //          m_fStandAlone will be set to true if applet is
run standalone
    //------------------------------------------------------------
---------
    private boolean m_fStandAlone = true;
    // STANDALONE APPLICATION SUPPORT
    //    The main( ) method acts as the applet's entry point
when it is run
    // as a standalone application. It is ignored if the applet
is run from
    // within an HTML page.
    //------------------------------------------------------------
---------
    public static void main(String args[ ])
    {
        // Create Toplevel Window to contain applet
EBrowse
        //-------------------------------------------------------------
---------
        EBrowseFrame frame = new
EBrowseFrame("EBrowse");
        // Must show Frame before we size it so insets( )
will return valid values
```

-continued

```
        //---------------------------------------------------------------
        frame.show( );
    frame.hide( );
        // The following code starts the applet running
within the frame window.
        // It also calls GetParameters( ) to retrieve
parameter values from the
        // command line, and sets m_fStandAlone to true
to prevent init( ) from
        // trying to get them from the HTML page.
        //---------------------------------------------------------------
        EBrowse applet_EBrowse = new EBrowse( );
        frame.add("Center", applet_EBrowse);
        applet_EBrowse.m_fStandAlone = true;
        applet EBrowse.init( );
        applet EBrowse.start( );
        frame.show( );
        }
        // EBrowse Class Constructor
        //---------------------------------------------------------------
        public EBrowse( )
        {
            // TODO: Add constructor code here
        }
        // APPLET INFO SUPPORT:
        //      The getAppletInfo( ) method returns a string
describing the applet's
        // author, copyright date, or miscellaneous information.
        //-----------------------------------------------------------------
        public String getAppletInfo( )
        {
            return "Name: EBrowse\r\n" +
                "Author: Mark Wickman\r\n" +
                "Created with Microsoft Visual J++ Version
1.1";
        }
        // The init( ) method is called by the AWT when an
applet is first loaded or
        // reloaded. Override this method to perform whatever
initialization your
        // applet needs, such as initializing data structures,
loading images or
        // fonts, creating frame windows, setting the layout
manager, or adding UI
        // components.
        //-----------------------------------------------------------------
        public void init( )
        {
        }
        // Place additional applet clean up code here. destroy( )
is called when
        // when you applet is terminating and being unloaded.
        //-----------------------------------------------------------------
        public void destroy( )
        {
            // TODO: Place applet cleanup code here
        }
        // EBrowse Paint Handler
        //-----------------------------------------------------------------
        public void paint(Graphics g)
        {
            g.drawString("Adsura Exchange Browser Sample,
Please run as a standalone application", 10, 20);
        }
        //      The start( ) method is called when the page
containing the applet
        // first appears on the screen. The AppletWizard's
initial implementation
        // of this method starts execution of the applet's
thread.
        //---------------------------------------------------------------
```

-continued

```
        public void start( )
        {
            // TODO: Place additional applet start code here
        }
        //          The stop( ) method is called when the page
containing the applet is
        // no longer on the screen. The AppletWizard's initial
implementation of
        // this method stops execution of the applet's thread.
        //----------------------------------------------------------------
        public void stop( )
        {
        }
}
End File Listing: EBrowse.java
Begin File Listing: EBrowseFrame.java
//****************************************************************
*****
// EBrowseFrame.java:
//****************************************************************
*****
import java.awt.*;
import java.net.*;
import java.io.*;
import java.util.*;
//Test Address at:
// http://sabre/testweb/parse.htm
//==========================================================
=========================
// STANDALONE APPLICATION SUPPORT
//         This frame class acts as a top-level window in which the
applet appears
// when it's run as a standalone application.
//==========================================================
=========================
class EBrowseFrame extends Frame
{
        Vector m__vConversionRates = new Vector(20);
        Vector m__vCurrencyNames = new Vector(20);
        boolean m__bInTag;
        String m__strAddress;
        void mCCurrencySel__Action(Event event)
        {
    mCAddress__EnterHit(null);
        }
        void mCAddress__EnterHit(Event event)
        {
    // Get the file pointed to by the text field and retrieve it
locally then crunch the page
    m__strAddress = m__cAddress.getText( );
        try
        {
        URL urlAddress = new URL(m__strAddress);
            DataInputStream disInput = new
DataInputStream(urlAddress.openStream( ));
            m__cDisplayArea.setText(" ");
            String strInputline;
            m__bInTag = false;
            while( (strInputline = disInput.readLine( )) !=
null)
            {
                //System.out.println(strInputline);
                ParseLine(strInputline);
            }
            disInput.close( );
        }
        catch(MalformedURLException e)
        {
          m__cAddress.setText(" ");
          System.out.println("MalformedURLException: " + e);
          return;
        }
        catch(IOException e)
        {
          m__cAddress.setText(" ");
    System.out.println("IOException: " + e);
        return;
        }
```

-continued

```
        }
        void ParseLine(String strInput)
        {
            String strStripped = new
String(StripTags(strInput));
            if(strStripped.length( ) > 0)
            {
                m_cDisplayArea.appendText(strStripped);
                m_cDisplayArea.appendText("\r\n");
            }
        }
        String StripTags(String strRaw)
        {
String strTagValue = new String( );
            String strTagContent = new String( );
            for(int i = 0; i < strRaw.length( ); i++)
            {
                char cTest = strRaw.charAt(i);
                switch(cTest)
                {
                 case '<':
                        m_bInTag = true;
                    break;
                    case '>':
                        m_bInTag = false;
                        break;
                    default:
                        if(!m_bInTag) strTagValue +=
cTest;
                        else strTagContent +=
cTest;
                        break;
                }
            }
            return(ProcessTag(strTagContent, strTagValue));
        }
        String ProcessTag(String strTag, String strTagValue)
        {
    if(strTag.equalsIgnoreCase("title/title") == true)
            {
                setTitle(strTagValue);
                return(" ");
            }
            int nTemp = -1;
            if( (nTemp = strTag.indexOf("act")) != -1 &&
strTag.indexOf("act",nTemp + 1) != -1)
            {
    //Adsura Couplet Technology Tag
                //Strip out the Denominator and Amount
                int nDenom = strTag.indexOf("denom");
                int nDenomStart =
strTag.indexOf("\"",nDenom + 4);
                int nDenomEnd =
strTag.indexOf("\"",nDenomStart + 1);
                String strDenom = new
String(strTag.substring(nDenomStart + 1,nDenomEnd));
                int nAmount = strTag.indexOf("amount");
                int nAmountStart =
strTag.indexOf("\"", nAmount + 4);
                int nAmountEnd =
strTag.indexOf("\"", nAmountStart + 1);
                String strAmount = new
String(strTag.substring(nAmountStart + 1,nAmountEnd));
        return(CalculateDisplayAmount(strDenom,strAmount));
            }
            return(strTagValue);
        }
        String CalculateDisplayAmount(String strDenom, String
strAmount)
        {
            String strChosen = new
String((String)m_vCurrencyNames.elementAt(m_CurrencySel.g
etSelectedIndex( )));
 if(strDenom.compareTo(strChosen) == 0)
                return(strChosen + " " + strAmount);
 //OK, it is not the default
            //Now get the Value from the DataFile Vector that
Matches the String in the Currency Unit Vector
        Enumeration e = m_vCurrencyNames.elements( );
```

-continued

```
                int nCount = 0;
                while(e.hasMoreElements( ))
                {
    String strTemp = new String((String) e.nextElement( ));
                    if(strTemp.compareTo(strDenom) == 0) break;
                    nCount++;
                }
                float fEmbeddedRate =
((Float)m_vConversionRates.elementAt(nCount)).floatValue( );
                float fDefaultAmount = ( (new
Float(strAmount)).floatValue( ));
                float fSelectedRate =
((Float)m_vConversionRates.elementAt(m_cCurrencySel.getSel
ectedIndex( ))).floatValue( );
                //To calculate the Exchanger Rate Ratio (Selected
Rate/Default (Embedded) Rate)
                float fRatio = (float)
fSelectedRate/fEmbeddedRate;
                //To Calculate the converted Value multiply the
Rate Ratio by the Original Value
                Float fConverted = new Float(fDefaultAmount *
fRatio);
                Integer nRounded = new Integer((int)
Math.floor(fConverted.floatValue( )));
                Float fRemainder = new Float((float)
(fConverted.floatValue( )) % nRounded.intValue( ));
                String strRounded = new
String(nRounded.toString( ));
                String strTemp = new
String(fRemainder.toString( ));
                String strHold = new String(" ");
                int nCharCount = 0;
                boolean bStartAdding = false;
        for(int i = 0; i < strTemp.length( ); i++)
                {
                    char cTest = strTemp.charAt(i);
                    switch(cTest)
                    {
                    case '.':
                            bStartAdding = true;
                        break;
                    default:
                            if(bStartAdding && nCharCount
< 2)
                            {
                                strHold += cTest;
            nCharCount++;
                            }
                        break;
                    }
                }
                for(int i = 0; i < 2 && strHold.length( ) < 2; i++)
                    strHold += "0";
        return(strChosen + " " + strRounded + "." + strHold);
            }
            // EBrowseFrame constructor
            //---------------------------------------------------------------
            public EBrowseFrame(String str)
            {
                // TODO: Add additional construction code here
                super (str);
                    //{{INIT_CONTROLS
                setLayout(null);
                addNotify( );
                resize(insets( ) .left +insets( ) .right +483,insets( ).top
+insets( ).bottom + 367);
                setBackground(new Color(12632256));
                m_cDisplayArea = new java.awt.TextArea( );
                m_cDisplayArea.setEditable(false);
                m_cDisplayArea.reshape(insets( ).left +
12,insets( ).top + 12,456,252);
                add(m_cDisplayArea);
                m_cAddress = new java.awt.TextField( );
                m_cAddress.reshape(insets( ).left + 84,insets( ).top
+288,384,24);
                add(m_cAddress);
                Addresslabel = new java.awt.Label("Address:");
                Addresslabel.reshape(insets( ).left + 12,insets( ).top +
```

-continued

```
288,60,24);
            add(Addresslabel);
            m_cCurrencySel = new java.awt.Choice( );
            m_cCurrencySel.addItem("American Dollars");
            m_cCurrencySel.addItem("Australian Dollars");
            m_cCurrencySel.addItem("Austrian Schillings");
            m_cCurrencySel.addItem("Bahamian Dollars");
            m_cCurrencySel.addItem("Barbados Dollars");
            m_cCurrencySel.addItem("Belgian Francs");
            m_cCurrencySel.addItem("Bermudian Dollars");
            m_cCurrencySel.addItem("British Pounds");
            m_cCurrencySel.addItem("Canadian Dollars");
            m_cCurrencySel.addItem("Chilean Pesos");
            m_cCurrencySel.addItem("Chinese Renmimbi");
            m_cCurrencySel.addItem("Danish Kroner");
            m_cCurrencySel.addItem("Dutch Guilders");
            m_cCurrencySel.addItem("Egyptian Pounds");
            m_cCurrencySel.addItem("European Currency
Units");
            m_cCurrencySel.addItem("Finnish Markka");
            m_cCurrencySel.addItem("French Francs");
            m_cCurrencySel.addItem("German Marks");
            m_cCurrencySel.addItem("Greek Drachmas");
            m_cCurrencySel.addItem("Hong Kong Dollars");
            add(m_cCurrencySel);
            m_cCurrencySel.reshape(insets( ).left +
84,insets( ).top + 324,384,21);
            label1 = new java.awt.Label("Currency:");
            label1.reshape(insets( ).left + 12,insets( ).top +
324,60,24);
            add(label1);
            setTitle("Adsura Exchange Browser");
            //}}
            //{{INIT_MENUS
            //}}
            //use the Currency Denominator to set the
initial position of the choice menu
            m_cCurrencySel.select("American Dollars");
            //Now Setup the Vector with the Human
Readable Names for the currency
        m_vCurrencyNames.addElement((String)"USD");
        m_vCurrencyNames.addElement((String)"AUD");
        m_vCurrencyNames.addElement((String)"Sch");
        m_vCurrencyNames.addElement((String)"Bah$");
        m_vCurrencyNames.addElement((String)"Bar$");
        m_vCurrencyNames.addElement((String)"BFr");
        m_vCurrencyNames.addElement((String)"Ber$");
            m_vCurrencyNames.addElement((String)"L");
        m_vCurrencyNames.addElement((String)"Can$");
        m_vCurrencyNames.addElement((String)"Pes");
        m_vCurrencyNames.addElement((String)"CR");
        m_vCurrencyNames.addElement((String)"DK");
        m_vCurrencyNames.addElement((String)"DG");
        m_vCurrencyNames.addElement((String)"EP");
        m_vCurrencyNames.addElement((String)"ECU");
        m_vCurrencyNames.addElement((String)"FM");
        m_vCurrencyNames.addElement((String)"FFr");
        m_vCurrencyNames.addElement((String)"DM");
        m_vCurrencyNames.addElement((String)"GD");
        m_vCurrencyNames.addElement((String)"HK$");
            LoadDataFile( );
}
void LoadDataFile( )
        {
        try
        {
        URL urlAddress = new
URL("http://Sabre//testweb//rates.data");
            DataInputStream disInput = new
DataInputStream(urlAddress.openStream( ));
            String strInput;
            while( (strInput = disInput.readLine( )) !=
null)
            {
                Float fStoring = new Float(strInput);
    m_vConversionRates.addElement((Float)fStoring);
            }
            disInput.close( );
    }
```

-continued

```
    catch(MalformedURLException e)
    {
      System.out.println("MalformedURLException: " + e);
    return;
    }
    catch(IOException e)
    {
System.out.println("IOException: " + e);
      return;
    }
  }
    // The handleEvent( ) method receives all events
generated within the frame
    // window. You can use this method to respond to
window events. To respond
    // to events generated by menus, buttons, etc. or other
controls in the
    // frame window but not managed by the applet, override
the window's
    // action( ) method.
    //--------------------------------------------------------------
---------
    public boolean handleEvent(Event evt)
    {
        if (evt.target == m_cCurrencySel && evt.id ==
Event.ACTION_EVENT) {
            mCCurrencySel_Action(evt);
            return true;
        } else
        if (evt.target == m_cAddress && evt.id ==
Event.ACTION_EVENT) {
            mCAddress_EnterHit(evt);
            return true;
        }
        switch (evt.id)
        {
            // Application shutdown (e.g. user chooses
Close from the system menu).
            //---------------------------------------------------
---------------
            case Event.WINDOW_DESTROY:
                // TODO: Place additional clean up
code here
                dispose( );
                System.exit(0);
                return true;
            default:
                return super.handleEvent(evt);
        }
    }
    //{{DECLARE_CONTROLS
    java.awt.TextArea m_cDisplayArea;
    java.awt.TextField m_cAddress;
    java.awt.Label Addresslabel;
    java.awt.Choice m_cCurrencySel;
    java.awt.Label label1;
    //}}
    //{{DECLARE_MENUS
    //}}
}
```

While the above description contains many specificities, these should not be construed as limitations on the scope of the invention, but rather as an exemplification of one preferred embodiment thereof. Many other variations are possible.

Support for additional parameters that can be passed to the currency selection, exchange rate retrieval and price display object (2) that allow the document author to restrict the currencies that the price can be displayed in could be readily implemented by someone skilled in the art of programming. This would be of use in contexts such as, but not limited to, where payment is only possible with certain currencies.

Support for additional parameters that can be passed to the currency selection, exchange rate retrieval and price display object (2), that allow the document author to specify premiums that must be paid by customers for any given currency could be readily implemented by someone skilled in the art of programming. This would be of use to people such as, but not limited to, those whose costs of supplying goods are different for different countries, and want prices to reflect this.

The process of passing the exchange rate information from object to object can be implemented by using a common, or static, or global variable to store the information that is accessible by all objects, which is demonstrated by Example Two.

The price or prices which are to be displayed need not necessarily reside within the document or environment in which they are to be displayed. The currency selection, exchange rate retrieval and price display object or objects (2), or the price display object or objects (4), can obtain the prices to be displayed from a source which is separate from the document in which the prices are viewed.

The preferred currency in which the prices are to be displayed can be established by the user in a system variable that resides on the user's computer, or from user input when the prices are being displayed. The former is demonstrated by Example Two. version of the currency converter, and the latter is demonstrated by Example One and Example Three. An alternative source of the information specifying the default currency in which prices are to be displayed can be a source which relates to the group of computers in which the user's computer resides.

A currency selection, exchange rate retrieval and price display object (2) can display the entire document or environment containing the price or prices by itself, which is demonstrated by Example Three, or give the task of displaying the document after it has been modified to another display routine or program. The routine or program which can display the document need not necessarily reside on the same computer as that upon which the currency selection, exchange rate retrieval and price display object (2) resides. Consequently, the currency selection, exchange rate retrieval and price display object (2) need not necessarily reside on the user's machine.

In an ideal situation, all prices in all documents or environments would adhere to a standard format, in which case the currency selection, exchange rate retrieval and price display object (2) and other document and environment viewers could readily find all prices and display them in the user's preferred currency. Given the potential for error in parsing documents with variable price formats for the purpose of identifying prices, tags specifying where the price or prices are or parameters specifying the default currency and format of prices are part of the preferred implementation of the currency converter demonstrated in Example Three. Example Three could nevertheless be modified by someone skilled in the art of programming to look for common price formats instead of the tag it uses to identify prices.

Variations in the way in which the currency selection, exchange rate retrieval and price display object (2) finds the prices within the document or environment are possible. Someone skilled in the art of programming could readily produce an alternative implementation where the currency selection, exchange rate retrieval and price display object (2) in Example Three interprets a tag appearing separately from the prices within the document that specifies how all prices within the document are formatted, and their default currency. The currency selection, exchange rate retrieval and price display object (2) could then search and replace all prices using the price format specified in the parameter or parameters before displaying the document.

The tag appearing separately from the prices can be either located elsewhere within the document or environment, or can be located in a separate file that is defined to be the file specifying such parameters for the document or environment being viewed. An example of this would be a file placed in the base directory or subdirectory of a web site specifying the format of prices throughout the site or subdirectory respectively. An additional or the same file could also specify the default currency for the site or subdirectory. Either or both the default currency and the price format parameters can be specified in the same file or in separate files which are themselves separate from the document or environment being viewed.

Likewise, a source of the document or environment such as, but not limited to, a Hypertext Transfer Protocol (HTTP) server can inform the currency selection, exchange rate retrieval and price display object (2) of the default currency and price format in the document or environment being transferred to the currency selection, exchange rate retrieval and price display object (2) within the Hypertext Transfer Protocol (HTTP) header sent along with the document or environment. This would constitute an implementation of a simple universal commerce protocol (UCP).

Existing information retrieval software such as, but not limited to, World Wide Web (WWW) browsers or Virtual Reality Modeling Language (VRML) viewers, could with modification implement the Currency Selection, Exchange Rate Information Retrieval and Price Display object (2) functionality demonstrated by Example Three. A practitioner skilled in the art of programming could modify such software to implement the embodiment of the currency converter demonstrated by Example Three. The currency in which prices are to be displayed can be specified by methods such as the following:

the user specifying within the software's preferences what currency prices should be displayed in the user specifying on a document by document basis what currency prices should appear in the software itself deducing the currency in which to display prices by reading operating system or user environment variables the software establishing the preferred currency from a source of configuration information pertaining to the group of computers in which the user's computer resides.

Such software, such as but not limited to a World Wide Web (WWW) browser, could parse the information, looking for prices in forms such as:

looking for the characteristic format of prices, such as the dollar symbol ($) followed by numbers representing dollars and cents, and by then making assumptions based on the source of the document it is displaying (for example if it is from an American World Wide Web (WWW) site, or an Australian World Wide Web (WWW) site, decide what the default currency is, and then replace the default prices with prices in the preferred currency in a preferred implementation looking for parameters such as, but not limited to, the tag used by Example 3 described above, which gives the default currency and the price in the default currency, which then allows the software, such as but not limited to, a World Wide Web (WWW) browser to retrieve the appropriate exchange rate information to display the price or prices in the user's selected currency.

price formats specified within information packets such as, but not limited to, Hypertext Transfer Protocol (HTTP) headers sent with documents or environments transmitted using Hypertext Transfer Protocol (HTTP).

In a preferred embodiment, the parameters embedded within the document or environment that the currency selection, exchange rate retrieval and price display object (2) views would be formatted such that the default price to be displayed with its default currency symbol would still be displayed by earlier software, such as but not limited to, older World Wide Web (WWW) browsers, which are unable to recognize the tag representing a price field.

Alternatively, the software, such as but not limited to a World Wide Web (WWW) browser, could implement the currency converter by using a "plug-in" which would perform the function of the currency selection, exchange rate retrieval and price display object (2) within the software.

Various possibilities exist for the means by which the prices within the document or environment are displayed by either the currency selection, exchange rate retrieval and price display object (2), or the price display object (4), such as but not limited to:

- the displayed price can consist of a picture embedded within the document or environment
- the displayed price can consist of a text string embedded within the text of the document or environment
- the displayed price can consist of either a text string or a picture that is embedded within a picture in the document or environment
- the process can be displayed as a layer that sits over the original displayed document or environment as an overlay.

The means by which the exchange rate information source (1) is accessed are also subject to variation, such as, but not limited to:

- in scenarios such as a document or environment being accessed over the World Wide Web by a user, the site from the which the exchange rate information is retrieved can keep track of the user and send information directly to the user in a "push stream".
- new exchange rate information could be accessed only at predefined intervals over time, eliminating the need to access exchange rate information for each and every change in viewing currency.
- modifying the format of the exchange rate information, such as but not limited to having separate files for different currencies, or separate locations for exchange rate information for different currencies.
- change the sequence in which the objects on the page are informed of the latest exchange rate information after the information has been retrieved from the exchange rate information source (1), as is demonstrated by Example One.
- in a preferred implementation, use an automatic routine to update the exchange rate information source regularly to match true exchange rates.
- in order to minimize communications network traffic, the currency selection, exchange rate retrieval and price display object (2) or the currency selection and exchange rate retrieval object (3) could initially request exchange rate information detailing all currencies at that point in time, but subsequent retrievals would only need to obtain exchange rate information relating to the currencies whose exchange rates had changed.
- the currency selection, exchange rate retrieval and price display object (2) or the currency selection and exchange rate retrieval object (3) need not necessarily obtain the exchange rate information in discrete transactions. A connection could be established with the exchange rate information source (1) that remains open until the document or environment in which the prices are being displayed is left by the user, or the connection remains open for the whole time the user is accessing the network or has the network accessible. This would however impose a greater load on the exchange rate information source (1).
- as mentioned in the descriptions of the currency selection, exchange rate retrieval and price display object (2) and the currency selection and exchange rate retrieval object (3), the exchange rate information can be retrieved or received using any number of data transfer protocols, and need not necessarily be transferred over the same communications network utilized to retrieve the documents or environments in which the prices are viewed. The exchange rate information can be retrieved from sources using methods and communications networks such as, but not limited to:
  Hypertext Transfer Protocol (HTTP) servers,
  File Transfer Protocol (FTP) servers,
  from information transmitted over the vertical blanking interval in television transmissions (otherwise known as teletext) which is received, translated and then utilized by the computer.
  from packet radio data utilizing protocols such as X.25

A preferred implementation in which the currency selection, exchange rate retrieval and price display object or objects (2) or price display object or objects (4) display only the price within a document or environment or pass a representation of the price such as but not limited to an image or text string to a program that displays the document or environment, would ideally utilise a platform independent programming language such as, but not limited to, Java™ in order to make the exchange rate retrieval and price display object or objects (2) and price display object or objects (4) as universally viewable as possible.

The appearance and user interface of the currency selection, exchange rate retrieval and price display object (2), currency selection and exchange rate retrieval object (3) and price display object (4) can be modified as follows:

- implementing new or different cosmetic features
- implement a new or different method for currency selection, such as, but not limited to utilizing operating system variables, or preferences specified by the user.

Someone skilled in the art of computer programming can duplicate the functionality of the currency converter in another programming language, software environment, software package, network environment, or another medium in which prices are embedded.

A skilled programmer could also implement the currency converter as a readily embedded object able to be used by others within their programs, operating systems or environments.

One of ordinary skill in the art of computer programming and Hypertext Markup Language design could implement the functionality of the currency converter using scripts or macro languages embedded within Hypertext Markup Language documents or, more generally, in any document or environment whose viewing software supports the execution of embedded macros or scripts. For example, the currency converter could be implemented within Dynamic Hypertext Markup Language (Dynamic HTML) to display prices in the user's selected currency. Scripts or macros could also interact with embedded software objects such as, but not limited to, applets or ActiveX controls to implement the functionality of the currency converter.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A computer system attached to a network, the computer system including an attached display for displaying price information and a computer program comprising:

(a) a single software object for displaying one or more prices, including logic for establishing an amount and a currency and which interprets parameters stored in a document or environment that specify a default currency to be displayed;

(b) display logic for displaying the price in the appropriate currency by reading operating system information indicative of a desired currency;

(c) networking logic that retrieves from a source an exchange rate required to perform a conversion to the desired currency; and (d) selection logic for allowing use of the display to select the desired currency during the display of one or more of the prices on the display.

2. The computer system as recited in claim 1, including a pop-up-menu that prompts a user to enter appropriate information.

3. The computer system as recited in claim 1, wherein an operating system variable in interrogated to determine a location for performing a currency conversion operation.

4. The computer system as recited in claim 1, wherein the conversion is performed as a cursor is passed over the price on the display.

5. The computer system as recited in claim 4, wherein the conversion is only performed when an indicia of performance is entered into the computer system.

6. The computer system as recited in claim 1, wherein the computer utilizes an object oriented framework.

7. The computer system as recited in claim 1, wherein a menu command is used to present a menu of selections on the display.

8. The computer system as recited in claim 1, including logic that supports smartcard transactions.

9. The computer system as recited in claim 1, including an identification command to retrieve identity information indicative of a default currency for a user.

10. The computer system as recited in claim 1, wherein information traversing the network is encrypted.

11. A method for performing currency conversion utilizing a computer coupled to a network, comprising the steps of:

(a) displaying one or more prices utilizing logic for establishing the default amount and currency by interpreting parameters embedded in a document or environment;

(b) displaying the price in the appropriate currency by reading operating system information indicative of a desired currency;

(c) retrieving an exchange rate information required to perform a conversion to the desired currency by network query; and (d) allowing use of a display to select the desired currency during the display of one or more of the prices on the display.

12. The method as recited in claim 11, including a pop-up-menu that prompts a user to enter appropriate information.

13. The method as recited in claim 11, wherein an operating system variable is interrogated to determine a location for performing a conversion operation.

14. The method as recited in claim 11, wherein the conversion is performed as a cursor is passed over the price on the display.

15. The method as recited in claim 14, wherein the conversion is only performed when an indicia of performance is detected.

16. The method as recited in claim 11, wherein the computer utilizes an object oriented framework.

17. The method as recited in claim 11, wherein a menu command is used to present a menu of selections on the display.

18. The method as recited in claim 11, including logic that facilitates smartcard transactions.

19. The method as recited in claim 11, including an identification command to retrieve identity information including a default currency for a user.

20. The method as recited in claim 11, wherein information traversing a network is encrypted.

21. A computer program embodied on a computer-readable medium for performing currency conversion utilizing a computer coupled to a network, comprising:

(a) a code segment that displays one or more prices utilizing logic for establishing a default currency which interprets parameters embedded in a document or environment;

(b) a code segment that displays the price in the appropriate currency by reading operating system variables indicative of a desired currency;

(c) a code segment that retrieves exchange rate information to convert a desired currency utilizing the network to retrieve the exchange rate information; and (d) a code segment that allows use of a display to select the desired currency during the display of one or more of the prices on the display.

22. The computer program as recited in claim 21, including a pop-up-menu that prompts a user to enter appropriate information.

23. The computer program as recited in claim 21, wherein an operating system variable is interrogated to determine a location for performing a currency conversion.

24. The computer program as recited in claim 21, in which a conversion is performed as a cursor is passed over a price display.

25. The computer program as recited in claim 24, wherein the conversion is only performed when an indicia of performance is detected.

26. The computer program as recited in claim 21, wherein the computer utilizes an object oriented framework.

27. The computer program as recited in claim 21, wherein a menu command is used to present a menu of selections on the display.

28. The computer program as recited in claim 21, including a command to manage smartcard transactions.

29. The computer program as recited in claim 21, including an identification command that retrieves identity information including a default currency for a user.

30. The computer program as recited in claim 21, wherein information traversing the network is encrypted.

31. The computer system as recited in claim 1, wherein the networking logic retrieves only the exchange rates required to perform the conversion from or to the desired currency selected by the selection logic.

32. The computer system as recited in claim 1, wherein the networking logic retrieves the exchange rate based on an age of the exchange rate.

33. The computer system as recited in claim 1, wherein the display logic is adapted for displaying a plurality of the prices in different currencies and the networking logic retrieves a plurality of exchange rates required to perform conversions to the desired currencies selected by the selection logic.

34. The computer system as recited in claim 1, wherein a plurality of objects are included for displaying more than one price, and one of the objects receives the exchange rate from the source and subsequently relays the exchange rate to the remaining objects.

* * * * *